United States Patent
Choi et al.

(10) Patent No.: US 11,818,673 B2
(45) Date of Patent: Nov. 14, 2023

(54) ELECTRONIC DEVICE FOR ALLEVIATING SIGNAL INTERFERENCE WITH NEIGHBORING BSS AND CONTROL METHOD THEREOF

(71) Applicant: Samsung Electronics Co., Ltd., Gyeonggi-do (KR)

(72) Inventors: Junsu Choi, Gyeonggi-do (KR); Sunkee Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 43 days.

(21) Appl. No.: 17/350,432

(22) Filed: Jun. 17, 2021

(65) Prior Publication Data

US 2021/0410089 A1 Dec. 30, 2021

(30) Foreign Application Priority Data

Jun. 24, 2020 (KR) ........................ 10-2020-0077045

(51) Int. Cl.
*H04W 56/00* (2009.01)
*H04W 74/08* (2009.01)
*H04W 52/02* (2009.01)

(52) U.S. Cl.
CPC ..... *H04W 56/001* (2013.01); *H04W 52/0235* (2013.01); *H04W 74/0808* (2013.01)

(58) Field of Classification Search
CPC ........... H04W 56/001; H04W 56/0015; H04W 52/0225; H04W 52/0209; H04W 52/0235; H04W 74/0808; H04W 74/08; H04W 84/12; H04W 48/04; H04W 48/12; Y02D 30/70; H04J 11/0023; H04B 1/401; H04B 17/345
See application file for complete search history.

(56) References Cited

U.S. PATENT DOCUMENTS

| | | | |
|---|---|---|---|
| 10,952,245 B1* | 3/2021 | Smith | H04W 74/08 |
| 2003/0236103 A1 | 12/2003 | Tamaki et al. | |
| 2009/0080386 A1* | 3/2009 | Yavuz | H04W 52/0238 |
| | | | 370/337 |
| 2014/0226539 A1 | 8/2014 | McCoy | |

(Continued)

FOREIGN PATENT DOCUMENTS

| | | |
|---|---|---|
| KR | 1020170111643 | 10/2017 |
| WO | WO2016166404 A1 * | 10/2016 |
| WO | WO 2018-039111 | 3/2018 |

OTHER PUBLICATIONS

International Search Report dated Sep. 1, 2021 issued in counterpart application No. PCT/KR2021/007087, 9 pages.

*Primary Examiner* — Sudesh M Patidar
(74) *Attorney, Agent, or Firm* — The Farrell Law Firm, P.C.

(57) ABSTRACT

An electronic device and method thereof are provided for alleviating signal interference with a neighboring BSS. The electronic device includes a communication circuit, and a processor configured to receive, using the communication circuit, a synchronization signal from a first external electronic device, and based on the received synchronization signal, determine an operation mode of the electronic device as one of a DL operation mode or a UL operation mode. The synchronization signal sets the operation mode of the electronic device to be identical to an operation mode of a second external electronic device included in a neighboring BSS.

13 Claims, 20 Drawing Sheets

(56) References Cited

U.S. PATENT DOCUMENTS

| | | |
|---|---|---|
| 2015/0189592 A1 | 7/2015 | Jafaran et al. |
| 2015/0281993 A1 | 10/2015 | Chen et al. |
| 2015/0382283 A1* | 12/2015 | Wang ................ H04W 52/0216 |
| | | 370/328 |
| 2016/0157195 A1* | 6/2016 | Wang .................. H04W 56/001 |
| | | 370/350 |
| 2017/0353921 A1* | 12/2017 | Li ...................... H04W 52/0206 |
| 2018/0205434 A1* | 7/2018 | Cherian ............... H04B 7/0452 |
| 2019/0334667 A1 | 10/2019 | Sankar et al. |
| 2020/0015219 A1* | 1/2020 | Asterjadhi ............ H04W 28/20 |
| 2020/0112385 A1* | 4/2020 | Yang ..................... H04W 24/08 |
| 2020/0119774 A1* | 4/2020 | Zhang ................... H04L 5/0051 |
| 2021/0058221 A1* | 2/2021 | Taneja .................. H04L 5/1461 |
| 2021/0068137 A1* | 3/2021 | Thubert ................ H04W 40/24 |
| 2021/0144657 A1 | 5/2021 | Ang et al. |
| 2021/0266778 A1* | 8/2021 | Cao ....................... H04W 76/11 |
| 2022/0030611 A1* | 1/2022 | Oteri ..................... H04B 7/024 |

\* cited by examiner

ELECTRONIC DEVICE FOR ALLEVIATING SIGNAL INTERFERENCE WITH NEIGHBORING BSS AND CONTROL METHOD THEREOF

CROSS-REFERENCE TO RELATED APPLICATION(S)

This application is based on and claims priority under 35 U.S.C. § 119 to Korean Patent Application No. 10-2020-0077045, filed on Jun. 24, 2020, in the Korean Intellectual Property Office, the entire disclosure of which is incorporated herein by reference.

BACKGROUND

1. Field

The disclosure relates generally to an electronic device for alleviating signal interference with a neighboring basic service set (BSS) and a control method thereof.

2. Description of Related Art

The various services and functions provided by electronic devices, e.g., portable electronic devices such as smart phones, have gradually increased. To increase the utility of such electronic devices and satisfy the changing needs of various users, communication service providers and/or electronic device manufacturers provide various functions and develop electronic devices competitively to differentiate them from other companies. Accordingly, various functions provided in electronic devices have become increasingly sophisticated.

An electronic device may exchange data with another electronic device via a wireless network, such as a wireless local area network (WLAN), through an access point (AP). A transmission method of the WLAN is defined in an Institute of Electrical and Electronics Engineers (IEEE) 802.11 standard, which has evolved through various amendments such as IEEE 802.11n, IEEE 802.11ac, or IEEE 802.11ax. In a congested environment in which a plurality of APs and electronic devices using the IEEE 802.11 standard exist, multi-AP coordination may be required.

In order to provide a large number of users with a WLAN without a coverage hole in a wide area, a large number of APs may be installed whose coverage areas overlap with each other. However, a large number of neighboring (or adjacent) APs and electronic devices connected to them share limited frequency resources, thereby causing a congestion environment in which signal interference occurs and degrading performance in a data transmission/reception speed or latency due to signal interference.

In a WLAN environment, i.e., a Wi-Fi communication environment, a transmission device may apply a steering weight vector to a plurality of antennas and transmit a communication signal. A reception device may apply a combining weight vector to a plurality of antennas and receive a communication signal. An AP or client included in a specific BSS performs channel sounding for the BSS to which the AP or client belongs and neighboring BSSs, obtains channel environment information for the BSS to which the AP or client belongs and the neighboring BSSs, and determines the weight vectors using the channel environment information, thereby alleviating signal interference with the neighboring BSSs. However, in order to obtain the channel environment information, there may be a cost for an electronic device which performs the channel sounding to use time resources to perform the channel sounding, and a cost for an electronic device, which is a target for obtaining the channel environment information, to periodically respond to channel sounding. In addition, in order to obtain changed channel environment information in real time, the cost may be further increased.

In determining the weight vectors, it may be required to consider whether electronic devices included in neighboring BSSs are capable of receiving a communication signal. In this case, a cost for obtaining real-time scheduling information of the electronic devices included in the neighboring BSSs may occur.

An electronic device, based on carrier sensing multiple access with collision avoidance (CSMA/CA), may perform a clear channel assessment (CCA) process for identifying whether a wireless medium is occupied by another electronic device before transmitting a communication signal. However, when an electronic device included in a specific BSS determines the weight vectors to perform a CCA process, even when signal interference with neighboring BSSs is alleviated, there may be a problem that a transmission device determines that a wireless medium is occupied or is likely to be occupied by another electronic device and then delays transmission of a communication signal, even though a reception device may receive the communication signal in a state in which the signal interference with the neighboring BSSs is alleviated.

SUMMARY

Accordingly, the present disclosure provides embodiments that are designed to address at least the problems and/or disadvantages described above and to provide at least the advantages described below.

An aspect of the disclosure is to provide an electronic device that may identify an external electronic device affected by signal interference and selectively obtain channel environment information for the identified external electronic device.

Another aspect of the disclosure is to provide an electronic device that may identify target wake time (TWT) information of an external electronic device that generates signal interference, and obtain channel environment information at time corresponding to an identified TWT service period.

Another aspect of the disclosure is to provide an electronic device that may provide TWT information to an external electronic device that is affected by signal interference.

Another aspect of the disclosure is to provide an electronic device that may cause an external electronic device, which generates signal interference, to perform a channel sounding operation.

In accordance with an aspect of the disclosure, an electronic device is provided, which includes a communication circuit, and a processor configured to receive, using the communication circuit, a synchronization signal from a first external electronic device, and based on the received synchronization signal, determine an operation mode of the electronic device as one of a downlink (DL) operation mode or an uplink (UL) operation mode. The synchronization signal sets the operation mode of the electronic device to be identical to an operation mode of a second external electronic device included in a neighboring BSS.

In accordance with another aspect of the disclosure, a method is provided for controlling an electronic device. The method includes receiving, using a communication circuit of the electronic device, a synchronization signal from a first external electronic device; and based on the received synchronization signal, determining an operation mode of the electronic device as one of a DL operation mode or a UL operation mode. The synchronization signal sets the operation mode of the electronic device to be identical to an operation mode of a second external electronic device included in a neighboring BSS.

In accordance with another aspect of the disclosure, an electronic device is provided, which includes a communication circuit; and a processor configured to receive, using the communication circuit, a signal transmitted by an external electronic device included in a neighboring BSS, based on the received signal, identify the external electronic device, and based on identifying the external electronic device, transmit, using the communication circuit, a first control signal to the external electronic device. The first control signal includes information controlling the external electronic device to perform a channel sounding operation.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Various embodiments of the disclosure will now be described in detail with reference to the accompanying drawings. In the following description, specific details such as detailed configuration and components are merely provided to assist the overall understanding of these embodiments of the disclosure. Therefore, it should be apparent to those skilled in the art that various changes and modifications of the embodiments described herein can be made without departing from the scope and spirit of the disclosure. In addition, descriptions of well-known functions and constructions are omitted for clarity and conciseness.

Figure 1:
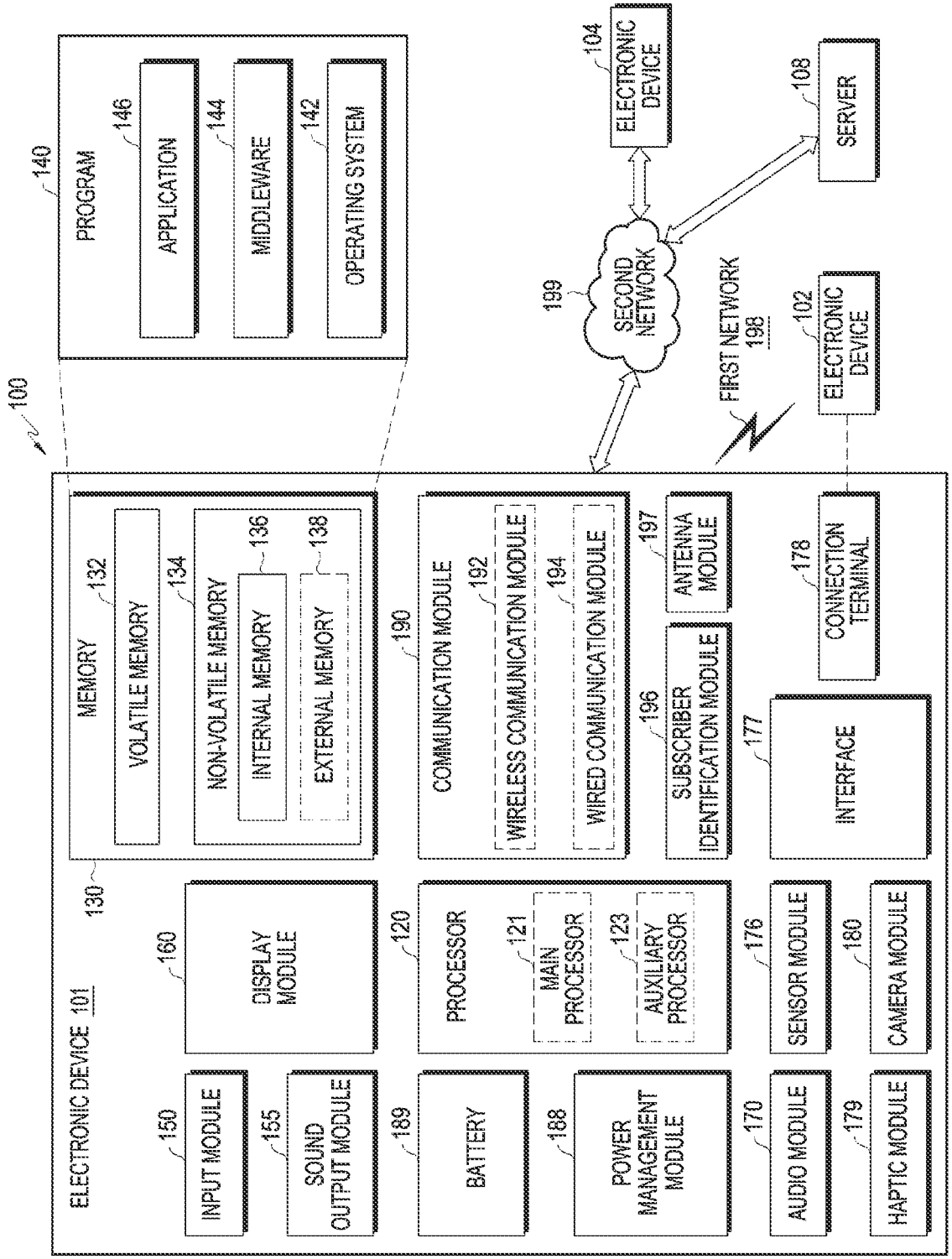
FIG. 1 illustrates an electronic device in a network environment according to an embodiment.

FIG. 1 illustrates an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123. According to an embodiment, the auxiliary processor 123 (e.g., the NPU) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the application processor) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or IR data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a PCB, a RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or MEC. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
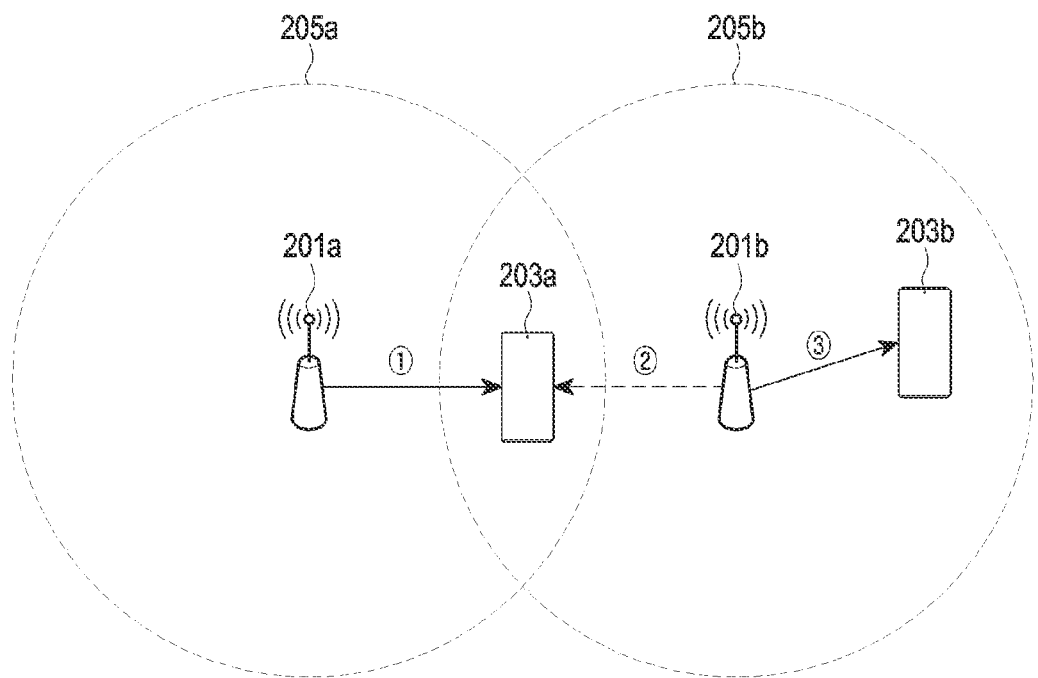
FIG. 2A illustrates a device affected by signal interference from an AP located nearby according to an embodiment.
Figure 2B:
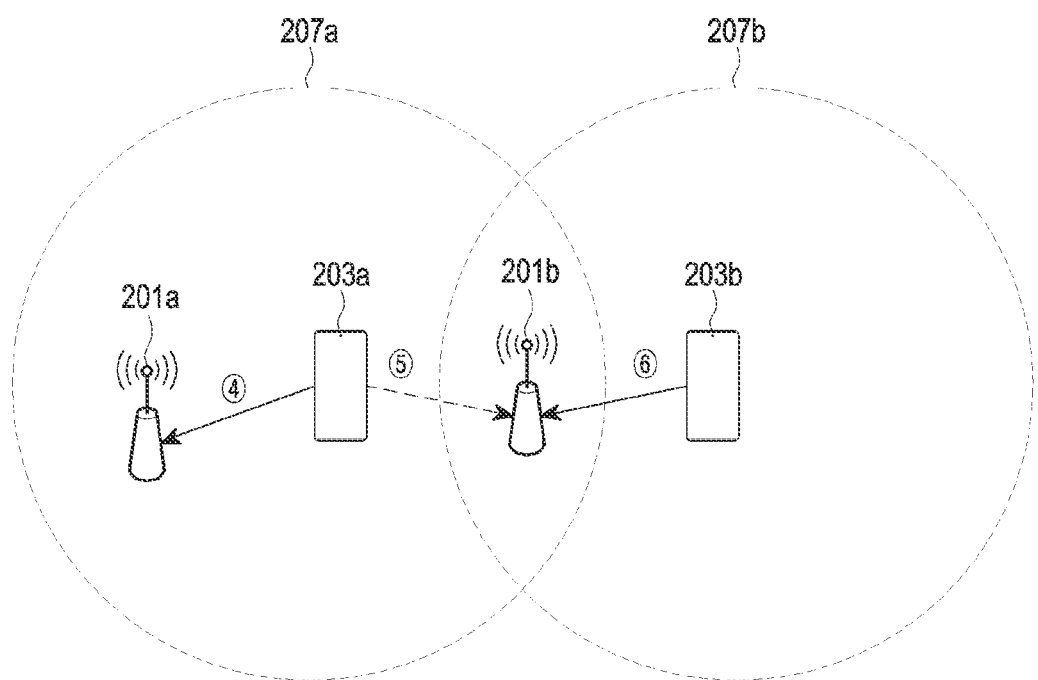
FIG. 2B illustrates an AP affected by signal interference from a device located nearby according to an embodiment.

FIG. 2A illustrates a device (e.g., an electronic device 101 in FIG. 1) affected by signal interference from an AP located nearby according to an embodiment. FIG. 2B illustrates an AP affected by signal interference from a device located nearby according to an embodiment.

Referring to FIGS. 2A and 2B, a first AP 201*a*, a second AP 201*b*, a first device 203*a*, and a second device 203*b* are illustrated. The first and second devices 203*a* and 203*b* may be referred to as 'clients'. The first AP 201*a* and the first device 203*a* may be connected via Wi-Fi communication to compose a first BSS. The second AP 201*b* and the second device 203*b* may be connected via Wi-Fi communication to compose a second BSS. The first and second BSSs may be described as neighboring BSSs to each other.

Referring to FIG. 2A, the first AP 201*a* has a first coverage area 205*a* and the second AP 201*b* has a second coverage are 205*b*. A coverage area of an AP (e.g., the first coverage area 205*a* or the second coverage area 205*b*) is a range in which the AP may transmit a communication signal (e.g., a range in which the communication signal transmitted by the AP may reach). The coverage area of the AP may vary according to a physical environment at which the AP is located, and the forms of the first coverage area 205*a* and the second coverage area 205*b* are exemplary.

In FIG. 2A, the first device 203*a* is located in an area where the first coverage area 205*a* and the second coverage area 205*b* overlap, and the second device 203*b* is located in the second coverage area 205*b* of the second AP 201*b*. While the first device 203*a* is located in the area where the first coverage area 205*a* and the second coverage area 205*b* overlap, the first device 203*a* may be affected by a communication signal (②) transmitted by the second AP 201*b* while receiving a communication signal (①) (e.g., a DL signal) transmitted by the first AP 201*a* (e.g., during a service period (e.g., a DL TWT service period) for receiving the DL signal). While the second device 203*b* is located in the second coverage area 205*b* it receives a communication signal (③) transmitted by the second AP 201*b*. For example, the communication signal (②) and the communication signal (③) transmitted by the second AP 201*b* may be communication signals transmitted by the second AP 201*b* to the second device 203*b*. The first device 203*a*, when compared with the second device 203*b*, may receive the communication signal (①) from the first AP 201*a* included in the same BSS (i.e., the first BSS) and the communication signal (②) from the second AP 201*b* included in a neighboring BSS (i.e., the second BSS). Consequently, if a plurality of APs coexist around the first device 203*a*, the first device 203*a* may receive communication signals within the same BSS and communication signals from a neighboring BSS, and the first device 203*a* may be affected by signal interference due to the communication signals from the neighboring BSS.

Referring to FIG. 2B, the first device 203*a* has a third coverage area 207*a* and the second device 203*b* has a fourth coverage area 207*b*. The forms of the third coverage area 207*a* and the fourth coverage area 207*b* are exemplary.

In FIG. 2B, the first AP 201*a* is located in the third area coverage area 207*a* and the second AP 201*b* is located in an area where the third coverage area 207*a* and the fourth coverage area 207*b* overlap. While the first AP 201*a* is located in the third coverage area 207*a*, it receives a communication signal (④) (e.g., a UL signal) transmitted by the first device 203*a*. While the second AP 201*b* is located in the area where the third coverage area 207*a* and the fourth coverage area 207*b* overlap, the second AP 201*b* may be affected by a communication signal (⑤) transmitted by the first device 201*a* while receiving a communication signal (⑥) (e.g., a UL signal) transmitted by the second AP 201*b* (e.g., during a service period (e.g., a UL TWT service period) for receiving the UL signal). For example, the communication signal (④) and the communication signal (⑤) transmitted by first device 203*a* may be communication signals transmitted by the first device 203*a* to the first AP 201*a*. The second AP 201*b*, when compared with the first AP 201*a*, may receive the communication signal (⑥) from the second device 203*b* included in the same BSS (i.e., the second BSS) and also the communication signal (⑤) from the first device 203*a* included in a neighboring BSS (i.e., the first BSS). Consequently, if a plurality of devices coexist around the second AP 201*b*, the second AP 201*b* may receive communication signals within the same BSS and communication signals from neighboring BSS, and the second AP 201*b* may be affected by signal interference due to the communication signals from the neighboring BSS.

Although not illustrated in FIGS. 2A and 2B, signal interference may also occur between APs located nearby. For example, if the second AP 201*b* operates in a DL operation mode, and the first AP 201*a* is located in the second coverage area 205*b* of the second AP 201*b* while the first AP 201*a* operates in a UL operation mode, the first AP 201*a* may receive a communication signal transmitted by the second AP 201*b* while receiving a communication signal transmitted by the first device 203*a*, and the first AP 201*a* may be affected by signal interference from the second AP 201*b*.

Signal interference may also occur between devices located nearby. For example, if the second device 203*b* operates in a UL operation mode, and the first device 203*a* is located in the fourth coverage area 207*b* of the second device 203*b* while the first device 203*a* operates in a DL operation mode, the first device 203*a* may receive a communication signal transmitted by the second device 203*b* while receiving a communication signal transmitted by the first AP 201*a*, and the first device 203*a* may be affected by signal interference from the second device 203*b*.

A device may be affected by interference due to a signal transmitted from an external electronic device (e.g., a device or an AP) within a neighboring BSS when a signal transmitted from an AP within the same BSS and a signal transmitted from the external electronic device within the neighboring BSS are received together, and when a period (e.g., a DL TWT service period) during which the device receives the signal from the AP within the same BSS, and a period (e.g., the DL TWT service period) during which the external electronic device within the neighboring BSS transmits the signal and/or a period (e.g., UL TWT service period) during which the external electronic device within the neighboring BSS receives a signal partially overlaps, and there is a possibility that the device may be affected by interference due to the signal transmitted by external electronic device.

An AP may be affected by interference due to a signal transmitted from an external electronic device (e.g., a device or an AP) within a neighboring BSS when a signal transmitted from a device within the same BSS and the signal transmitted from the external electronic device within the neighboring BSS are received together, and when a period (e.g., a UL TWT service period) during which the AP receives the signal from the device within the same BSS, and a period (e.g., the DL TWT service period) during which the external electronic device within the neighboring BSS transmits the signal and/or a period (e.g., the UL TWT service period) during which the external electronic device within the neighboring BSS receives a signal partially overlaps, and there is a possibility that the device may be affected by interference due to the signal transmitted by external electronic device.

Figure 3A:
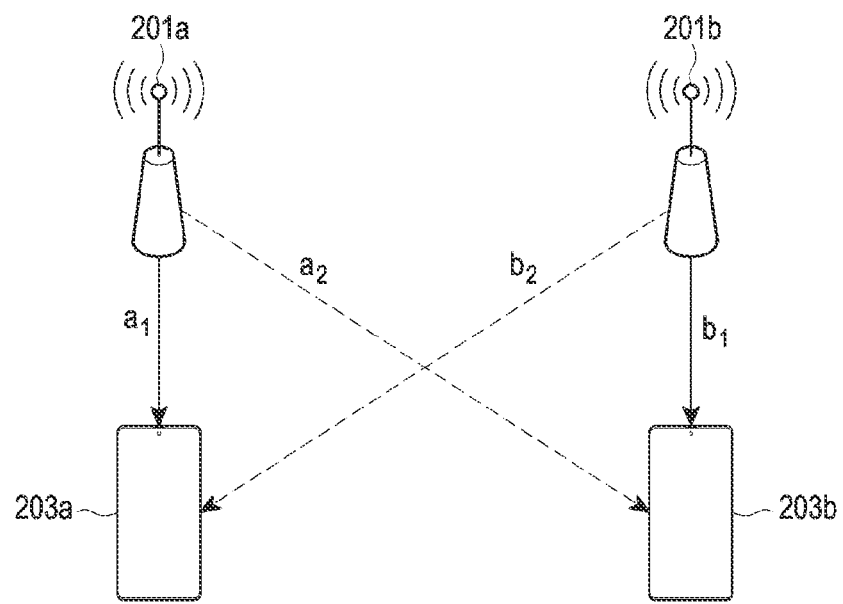
FIG. 3A illustrates signal interference from APs according to an embodiment.
Figure 3B:
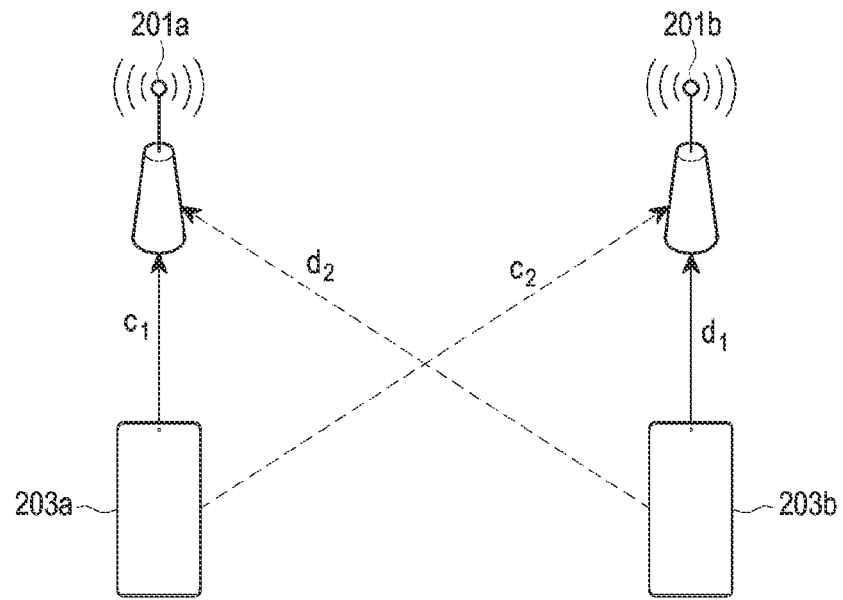
FIG. 3B illustrates signal interference from devices according to an embodiment.
Figure 3C:
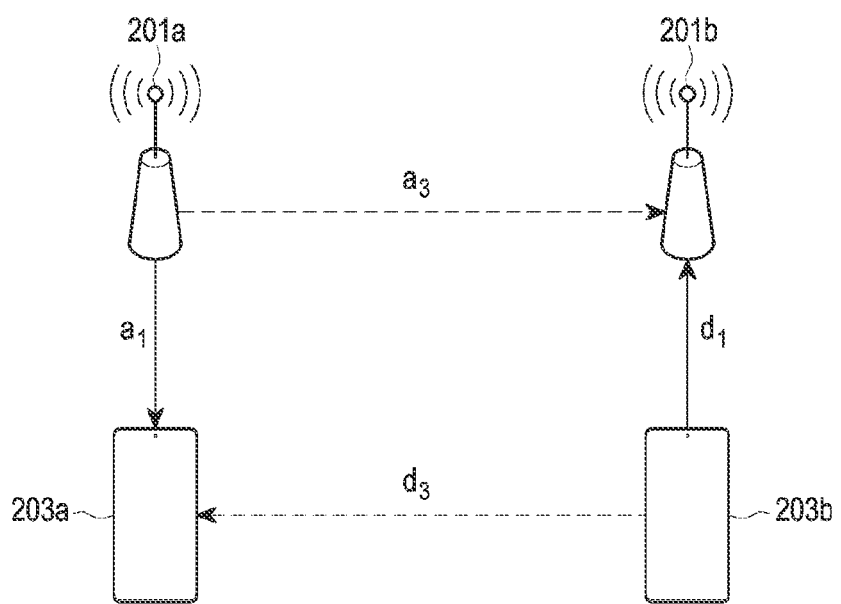
FIG. 3C illustrates signal interference from an AP and a device according to an embodiment.

FIG. 3A illustrates signal interference from APs according to an embodiment. FIG. 3B illustrates signal interference from devices according to an embodiment. FIG. 3C illustrates signal interference from an AP and a device according to an embodiment.

Referring to FIGS. 3A to 3C, a first AP 201a, a second AP 201b, a first device 203a, and a second device 203b are illustrated. The first AP 201a and the first device 203a may compose a first BSS, and the second AP 201b and the second device 203b may compose a second BSS. The first BSS and the second BSS may use the same frequency resources in an adjacent space and affect each other by signal interference.

Referring to FIG. 3A, the first AP 201a, the second AP 201b, the first device 203a, and the second device 203b operate in a DL operation mode. The first device 203a may operate in the DL operation mode, and receive a communication signal from the outside. The first device 203a receives a communication signal b2 transmitted by the second AP 201b included in a neighboring BSS (i.e., the second BSS) while receiving a communication signal a1 transmitted by the first AP 201a included in the same BSS (i.e., the first BSS). Similarly, the second device 203b may also operate in the DL operation mode, and receives a communication signal a2 transmitted by the first AP 201a included in a neighboring BSS (i.e., the first BSS) while receiving a communication signal b1 transmitted by the second AP 201b included in the same BSS (i.e., the second BSS). Consequently, during a period (e.g., a DL service period) during which the first device 203a and the second device 203b operate in the DL operation mode, the first device 203a and the second device 203b may receive a communication signal from the same BSS and a communication signal from a neighboring BSS, thereby being affected by signal interference.

Referring to FIG. 3B, the first AP 201a, the second AP 201b, the first device 203a, and the second device 203b operate in a UL operation mode. The first AP 201a may operate in the UL operation mode, and receive a communication signal from the outside. The first AP 201a receives a communication signal d2 transmitted by the second device 203b included in a neighboring BSS (i.e., the second BSS) while receiving a communication signal c1 transmitted by the first device 203a included in the same BSS (i.e., the first BSS). Similarly, the second AP 201b may also operate in the UL operation mode, and receives a communication signal c2 transmitted by the first device 203a included in a neighboring BSS (i.e., the first BSS) while receiving a communication signal d1 transmitted by the second device 203b included in the same BSS (i.e., the second BSS). Consequently, during a period (e.g., a UL service period) during which the first AP 201a and the second AP 201b operate in the UL operation mode, the first AP 201a and the second AP 201b may receive a communication signal from the same BSS and a communication signal from a neighboring BSS, thereby being affected by signal interference.

Referring to FIG. 3C, the first AP 201a and the first device 203a operate in a DL operation mode, and the second AP 201b and the second device 203b operate in an UL operation mode. The first device 203a may operate in the DL operation mode, and receive a communication signal from the outside. The first device 203a receives a communication signal d3 transmitted by the second device 203b included in a neighboring BSS (i.e., the second BSS) while receiving a communication signal a1 transmitted by the first AP 201a included in the same BSS (i.e., the first BSS). The second AP 201b may operate in the UL operation mode, and receives a communication signal a3 transmitted by the first AP 201a included in a neighboring BSS (i.e., the first BSS) while receiving a communication signal d1 transmitted by the second device 203b included in the same BSS (i.e., the second BSS). Consequently, when the first device 203a and the second AP 201b may receive a communication signal from the outside, the first device 203a and the second AP 201b may receive a communication signal from the same BSS and a communication signal from a neighboring BSS, thereby being affected by signal interference.

Figure 4:
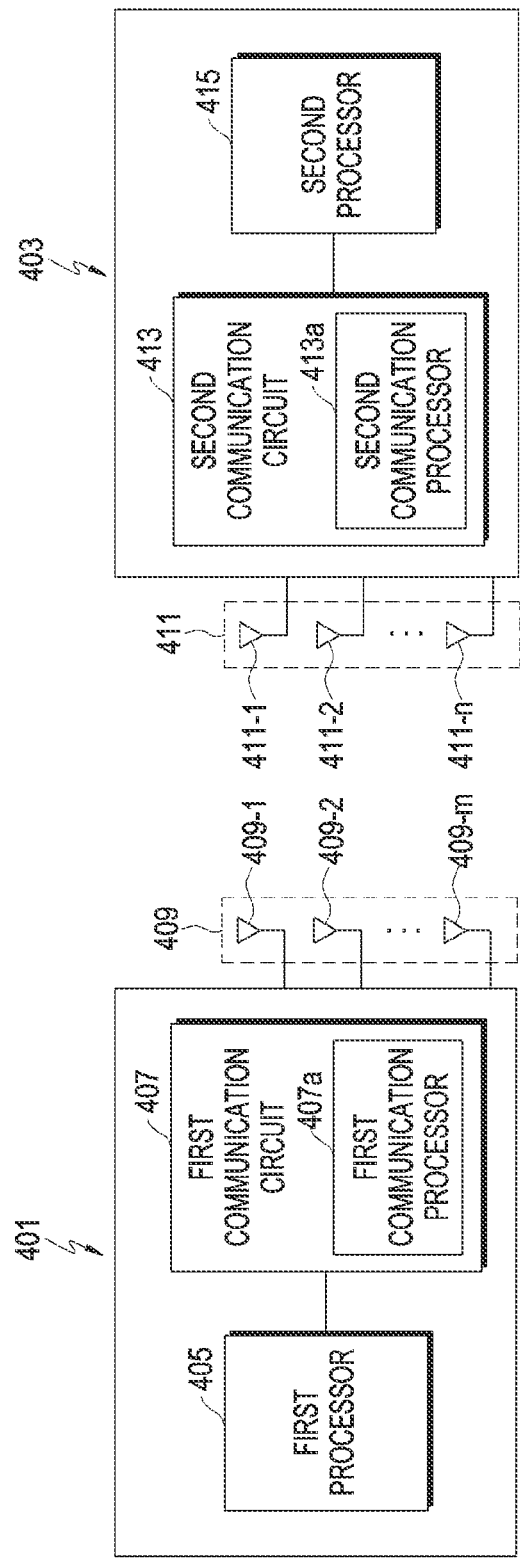
FIG. 4 illustrates a first electronic device and a second electronic device according to an embodiment.

FIG. 4 illustrates a first electronic device and a second electronic device according to an embodiment.

Referring to FIG. 4, a first electronic device 401 (e.g., an electronic device 101 of FIG. 1) includes a first processor 405 (e.g., a processor 120 in FIG. 1), a first communication circuit 407 (e.g., a wireless communication module 192 in FIG. 1), and a first antenna 409 (e.g., an antenna module 197 in FIG. 1). For example, the first electronic device 401 is a client device (e.g., a first device 203a or a second device 203b as illustrated in FIG. 2A).

The first processor 405 may include an application processor. The first processor 405 may perform a specific operation of the first electronic device 401 or control other hardware (e.g., the first communication circuit 407) to perform a specific operation.

The first processor 405 may control the first communication circuit 407 to form a first network (e.g., a first network 198 in FIG. 1) with an external electronic device (e.g., an electronic device 102 in FIG. 1 or a second electronic device 403). For example, the first network may include a Wi-Fi network.

The first processor 405 may control the first communication circuit 407 to receive a communication signal from the outside or transmit a communication signal to the outside. The first processor 405 may perform processing on the communication signal received from the outside. Reception of the communication signal in the first processor 405 may be performed during a DL service period (e.g., a first TWT service period) of a first CP 407a (e.g., an auxiliary processor 123 in FIG. 1). Transmission of the communication signal in the first processor 405 may be performed during a UL service period (e.g., a second TWT service period) of the first CP 407*a*.

All or some of the operations of the first processor 405 described above may be performed by the first CP 407*a* included in the first communication circuit 407.

The first communication circuit 407 may receive a communication signal from the outside or transmit a communication signal to the outside based on a Wi-Fi communication scheme. The first communication circuit 407 may include various components, for example, a modulator, a digital to analog (D/A) converter, a frequency converter, an analog to digital (A/D) converter, an amplifier, and/or a demodulator, e.g., for orthogonal frequency division multiplexing (OFDM) or orthogonal frequency division multiple access (OFDMA).

The first communication circuit 407 includes the CP 407*a*, which performs a specific operation of the first electronic device 401 or controls other hardware of the first communication circuit 407 to perform a specific operation.

The first CP 407*a* may control the first communication circuit 407 to receive a communication signal from the outside or transmit a communication signal to the outside. The first CP 407*a* may operate in a DL operation mode or an UL operation mode. The first CP 407*a* may operate in the DL operation mode during a DL service period (e.g., a DL service time) (hereinafter, referred to as a first period) and receive a communication signal from the outside. The first CP 407*a* may operate in the UL operation mode during a UL service period (e.g., a UL service time) (hereinafter, referred to as a second period) and transmit a communication signal to the outside. The first period and/or the second period may be determined based on negotiation with an external electronic device whose Wi-Fi communication connection is established. The first electronic device 401 may set the first period and/or the second period and request the first period and/or the second period from the external electronic device, and receive confirmation from the external electronic device.

Alternatively, the first electronic device 401 may receive a request for setting the first period and/or the second period from the external electronic device, and confirm this. The external electronic device whose Wi-Fi communication connection is established may determine the first period and/or the second period, and notify an external electronic device (e.g., an AP) included in the same BSS of information about the determined first period and/or second period. The first electronic device 401 may determine the first period and/or the second period and notify an external electronic device included in the same BSS of information about the determined first period and/or second period.

The first CP 407*a* may periodically wake up from a doze state based on TWT information and perform a DL operation or a UL operation. For example, the first CP 407*a* may wake up during a first service period (e.g., a TWT service period for a DL service) within the first period, and perform a DL operation, or the first CP 407*a* may wake up during a second TWT service period (e.g., a TWT service period for an UL service) within the second period, and perform an UL operation. Information about a wake time, an interval, and/or a length (e.g., a service period) of the first TWT service period may be included in first TWT information. Information about a wake time, an interval, and/or a length of the second TWT service period may be included in second TWT information. The first TWT service period and the second TWT service period may be continuous. The first CP 407*a* may periodically wake up, perform a DL and/or UL operation, and enter a doze state.

The first CP 407*a* may identify an external electronic device that transmits a communication signal received from the outside. The first CP 407*a* may identify specific information (e.g., address information) in a medium access control (MAC) header of a received communication signal (e.g., a packet) to identify (or confirm) an external electronic device that transmits the communication signal. The first CP 407*a* may identify whether the identified external electronic device is an external electronic device (e.g., an AP) which establishes a communication connection (e.g., a Wi-Fi communication connection) (e.g., which composes the same BSS) with the first electronic device 401. The first CP 407*a* may identify a designated field (e.g., a high-efficiency-signal-A (HE-SIG-A) field) of the received communication signal to identify (or confirm) the external electronic device which transmits the communication signal. For example, the first CP 407*a* may identify whether the external electronic device which transmits the communication signal is the external electronic device that establishes the communication connection with the first electronic device 401 based on identification information of a BSS (e.g., a BSS color) included in the HE-SIG-A field. The identification information of the BSS included in the HE-SIG-A field may include BSS color information defined in IEEE 802.11ax.

The first CP 407*a* may transmit, to the first processor 405, information about the external electronic device which transmits the communication signal and/or information about whether the identified external electronic device is the external electronic device that established the communication connection with the first electronic device 401. Identifying the external electronic device that transmits the communication signal and/or identifying whether the identified external electronic device is the external electronic device that established the communication connection with the first electronic device 401 may be performed by the first processor 405, and the first processor 405 may inform the first CP 407*a* of the information about the external electronic device that transmits the communication signal and/or the information about whether the identified external electronic device is the external electronic device that established the communication connection with the first electronic device 401.

If it is identified that the identified external electronic device is not the external electronic device that established the communication connection with the first electronic device 401 (e.g., if the identified external electronic device is an external electronic device of a neighboring BSS), the first CP 407*a* may determine that the identified external electronic device is an external electronic device (e.g., an interfering external electronic device) that generates signal interference.

The first CP 407*a* may control the first communication circuit 407 to transmit a first control signal to the external electronic device that generates the signal interference. The first control signal may include an action frame which causes an external electronic device which receives the first control signal to perform a specific operation (e.g., a channel sounding operation). The first control signal may include first TWT information (e.g., TWT information for a DL operation) of the first electronic device 401. The TWT information for the DL operation may include DL scheduling information. The operation of determining the identified external electronic device is the external electronic device (e.g., the interfering external electronic device) that generates the signal interference and/or the operation of transmitting the first control signal to the external electronic device that generates the signal interference may be performed by the first processor 405.

The first CP 407a may control the first communication circuit 407 to transmit a response signal to a channel sounding operation of an external electronic device. The first CP 407a may receive a reference signal for the channel sounding operation of the external electronic device. For example, the first CP 407a may receive, from the external electronic device, a null data packet announcement (NDPA) frame and a null data packet (NDP) for identifying channel environment information (e.g., a DL channel matrix) as a reference signal, according to performance of the channel sounding operation of the external electronic device. The first CP 407a may identify a specific field (e.g., a long training field (LTF)) of the received reference signal. The first CP 407a may identify the specific field (e.g., the LTF) of the received reference signal to identify (or estimate) channel environment information (e.g., a DL channel matrix) (hereinafter, referred to as first channel information) via which the reference signal is transmitted. The first CP 407a may transmit, to the external electronic device that transmits the reference signal, the identified first channel information as a response signal to the channel sounding operation (e.g., to the reference signal) of the external electronic device. For example, the first CP 407a may transmit, to the external electronic device, a compressed beamforming (CB) frame as the response signal. Receiving the reference signal and/or transmitting the response signal may be performed by the first processor 405 and/or a control operation of the first processor 405 to the first communication circuit 407.

The first CP 407a may control the first communication circuit 407 to receive a second control signal from an external electronic device. The external electronic device that transmits the second control signal may be an external electronic device (e.g., an interfered external electronic device) that is affected by signal interference due to a communication signal transmitted by the first electronic device 401. The second control signal may be an action frame that causes an electronic device (e.g., the electronic device 401) that receives the second control signal to perform a specific operation. For example, when the second control signal is received, the first CP 407a may control the first communication circuit 407 to transmit second TWT information (e.g., TWT information for a UL operation) of the first electronic device 401 to the external electronic device which transmits the second control signal. The TWT information for the UL operation may include UL scheduling information.

The first CP 407a may control the first communication circuit 407 to perform CCA. Before transmitting a communication signal, the first CP 407a may perform CCA to identify whether a wireless medium via which the communication signal is to be transmitted is occupied or is likely to be occupied by another electronic device. For example, the CCA may be performed with a signal detection scheme for identifying a preamble of the communication signal transmitted via the wireless medium and/or an energy detection scheme for identifying strength of the communication signal transmitted via the wireless medium. If it is identified that the wireless medium is occupied by an external electronic device (e.g., is in a busy state), the first CP 407a may delay transmission of the communication signal. The first CP 407a may identify identification information of a BSS (e.g., a BSS color) included in an HE-SIG-A field of a received communication signal according to a CCA result, and identify whether the received communication signal is a communication signal received from an external electronic device (e.g., an AP) that does not establish a communication connection (e.g., an AP of a different BSS) with the first electronic device 401.

If it is identified that the received communication signal is the communication signal received from the external electronic device that did not establish the communication connection, the first CP 407a may delay transmission of a communication signal.

If it is identified that the wireless medium is not occupied by the other electronic device (e.g., is in an idle state), the first CP 407a may perform transmission of a communication signal. If it is identified that the received communication signal is not the communication signal received from the external electronic device (e.g., the AP) that did not establish the communication connection with the first electronic device 401 based on the identification information of the BSS included in the HE-SIG-A field of the received communication signal according to the CCA result, the first CP 407a may identify that the wireless medium is not occupied by the external electronic device (e.g., is in the idle state). When the wireless medium is not occupied by the external electronic device, the first CP 407a may perform a random delay wait (e.g., a random back-off) and then transmit a communication signal. The first CP 407a may control the first communication circuit 407 to transmit, to an external electronic device (e.g., an AP) included in the same BSS, information indicating whether a first TWT service period of the first electronic device 401 is protected by an external electronic device (e.g., an AP) included in a neighboring BSS. For example, the first TWT service period of the first electronic device 401 being protected by the external electronic device included in the neighboring BSS may mean that the first electronic device 401 is not affected by a communication signal transmitted by the external electronic device included in the neighboring BSS during the first TWT service period of the first electronic device 401. The first TWT service period of the first electronic device 401 being protected by the external electronic device included in the neighboring BSS may mean that the external electronic device included in the neighboring BSS applies a steering weight vector (hereinafter, referred to as a first weight vector) so as not to generate signal interference to the first electronic device 401 during the first TWT service period of the first electronic device 401.

The first CP 407a may control the first communication circuit 407 to receive, from an external electronic device (e.g., an AP) included in the same BSS, information indicating whether a second TWT service period of the first electronic device 401 is protected by an external electronic device (e.g., a device) included in a neighboring BSS. For example, the second TWT service period of the first electronic device 401 being protected by the external electronic device included in the neighboring BSS may mean that the first electronic device 401 does not generate signal interference to the external electronic device included in the neighboring BSS during the second TWT service period of the first electronic device 401. For example, the second TWT service period of the first electronic device 401 being protected by the external electronic device included in the neighboring BSS may mean that the external electronic device included in the neighboring BSS applies a combining weight vector (hereinafter, referred to as a second weight vector) so as not to be affected by signal interference from the first electronic device 401 during the second TWT service period of the first electronic device 401.

If it is identified that the second TWT service period of the first electronic device 401 is protected by the external electronic device included in the neighboring BSS, the first CP 407a may suspend performance of a CCA operation and transmit a communication signal to the outside during the second TWT service period, regardless of whether the wireless medium is occupied by the other electronic device.

All or some of the operations of the first CP 407a described above may be performed by the first processor 405.

The first antenna 409 may transmit a signal from the first communication circuit 407 to the outside or may transfer a signal received from the outside to the first communication circuit 407. The first antenna 409 includes at least one of antennas 409-1, 409-2, . . . , and/or 409-m. The antennas 409-1, 409-2, . . . , and/or 409-m in the first antenna 409 may be used for spatial multiplexing and/or channel estimation. If a part of the antennas 409-1, 409-2, . . . , and/or 409-m in the first antenna 409 is used for channel estimation, a remaining part of the antennas 409-1, 409-2, . . . , and/or 409-m may be used for the spatial multiplexing.

The second electronic device 403 (e.g., the electronic device 102 in FIG. 1) includes a second processor 415, a second communication circuit 413, and a second antenna 411. For example, the second electronic device 403 is an AP (e.g., a first AP 201a or a second AP 201b as illustrated in FIG. 2A).

The second processor 415 may include an application processor. The second processor 415 may perform a specific operation of the second electronic device 403 or control other hardware (e.g., the second communication circuit 413) to perform a specific operation.

The second processor 415 may control the second communication circuit 413 to form a first network with an external electronic device (e.g., the first electronic device 401). For example, the first network may include a Wi-Fi network.

The second processor 415 may control the second communication circuit 413 to receive a communication signal from the outside or transmit a communication signal to the outside. The second processor 415 may perform processing on the communication signal received from the outside. Transmission and/or reception of a communication signal of the second processor 415 may be performed during a TWT service period of at least one external electronic device (e.g., a client) whose Wi-Fi communication connection is established. The second processor 415 may receive a communication signal transmitted during a first TWT service period of each of the at least one external electronic device. The second processor 415 may transmit a communication signal to a corresponding external electronic device (e.g., a client) during a second TWT service period of each of the at least one external electronic device. The second processor 415 may control the second communication circuit 413 to transmit, to the outside, information (e.g., a MAC address) about APs included in a neighboring BSS that participate in multi-AP cooperation via a beacon signal.

The second processor 415 may determine a weight vector for the second antenna 411 and apply the weight vector to the second antenna 411. The determination and/or application of the weight vector for the second antenna 411 may be performed by a second CP 413a. All or some of the operations of the second processor 415 described above may be performed by the second CP 413a included in the second communication circuit 413.

The second communication circuit 413 may receive a communication signal from the outside or transmit a communication signal to the outside based on a Wi-Fi communication scheme. The second communication circuit 413 may include various components, such as a modulator, a D/A converter, a frequency converter, an A/D converter, an amplifier, and/or a demodulator, e.g., for OFDM or OFDMA.

The second communication circuit 413 includes the second CP 413a which performs a specific operation of the second electronic device 403 or controls other hardware of the second communication circuit 413 to perform a specific operation.

The second CP 413a may control the second communication circuit 413 to receive a communication signal from the outside or transmit a communication signal to the outside. The second CP 413a may operate in a DL operation mode or a UL operation mode.

During a DL service period, the second CP 413a may operate in the DL operation mode and receive the communication signal from the outside. During a UL service period, the second CP 413a may operate in the UL operation mode and transmit the communication signal to the outside. The DL service period and/or the UL service period of the second CP 413a may correspond to a first period and/or a second period of an external electronic device (e.g., a client) whose Wi-Fi communication connection is established.

The second CP 413a may determine the DL service period and/or the UL service period, and notify the external electronic device (e.g., the client) whose Wi-Fi communication connection is established of the DL service period and/or the UL service period. The second CP 413a may receive information about the first period and/or the second period from the external electronic device whose Wi-Fi communication connection is established to determine the DL service period and/or the UL service period of the CP 413a. The DL service period and/or the UL service period of Transmission and/or reception of a communication signal of the second CP 413a may be performed during a TWT service period of at least one external electronic device (e.g., a client) whose Wi-Fi communication connection is established. The second CP 413a may receive a communication signal transmitted during a first TWT service period of each of at least one external electronic device. The second CP 413a may transmit a communication signal to a corresponding external electronic device during a second TWT service period of each of the at least one external electronic device.

The second CP 413a may identify (or confirm) an external electronic device that transmits a communication signal received from the outside. The second CP 413a may identify specific information (e.g., address information) in a MAC header of the received communication signal to identify (or confirm) the external electronic device that transmits the communication signal. The second CP 413a may identify whether the identified external electronic device is an external electronic device (e.g., a client) that established a communication connection (e.g., a Wi-Fi communication connection) with the second electronic device 403. The second CP 413a may identify a designated field (e.g., a high-efficiency-signal-A (HE-SIG-A) field) of the received communication signal to identify (or confirm) the external electronic device that transmits the communication signal. For example, the second CP 413a may identify whether the external electronic device that transmits the communication signal is the external electronic device that established the communication connection with the second electronic device 403 based on identification information of a BSS (e.g., a BSS color) included in the HE-SIG-A field. The identification information of the BSS included in the HE-SIG-A field may include BSS color information defined in IEEE 802.11ax.

The second CP 413a may transmit, to the second processor 415, information about the external electronic device which transmits the communication signal and/or information about whether the identified external electronic device is the external electronic device that established the communication connection with the second electronic device 403. Identifying the external electronic device that transmits the communication signal and/or identifying whether the identified external electronic device is the external electronic device that established the communication connection with the second electronic device 403 may be performed by the second processor 415, and the second processor 415 may inform the second CP 413a of the information about the external electronic device that transmits the communication signal and/or the information about whether the identified external electronic device is the external electronic device that established the communication connection with the second electronic device 403.

If it is identified that the identified external electronic device is not the external electronic device that established the communication connection with the first electronic device 401, the second CP 413a may determine that the identified external electronic device is an external electronic device that generates signal interference. The second CP 413a may control the second communication circuit 413 to transmit a second control signal to the external electronic device that generates the signal interference. The second control signal may be an action frame that causes an external electronic device that receives the second control signal to perform a specific operation. The second control signal may cause the external electronic device that receives the second control signal to transmit second TWT information of the external electronic device.

The second CP 413a may control the second communication circuit 413 to receive a first control signal from an external electronic device. The external electronic device may be affected by signal interference due to a communication signal transmitted by the second electronic device 403. The first control signal may include an action frame that causes the second electronic device 403 to perform a specific operation (e.g., a channel sounding operation). The first control signal may include first TWT information (e.g., TWT information for a DL operation) of the external electronic device. The second CP 413a may identify the first TWT information of the external electronic device and perform a channel sounding operation by controlling the second communication circuit 413 corresponding to the first TWT service period of the external electronic device. The second CP 413a may control the second communication circuit 413 to transmit a reference signal for the channel sounding operation to the external electronic device that transmits the first control signal. For example, the second CP 413a may transmit an NDPA frame and transmit an NDP for identifying channel environment information (e.g., a DL channel matrix) as a reference signal. The second CP 413a may control the second communication circuit 413 to receive, from the external electronic device, a response signal including information (e.g., first channel information) about a channel via which the reference signal is transferred. For example, the second CP 413a may receive, from the external electronic device, a CB frame as a response signal. Transmitting the reference signal and/or receiving the response signal may be performed by the second processor 415 and/or a control operation of the second processor 415 to the second communication circuit 413.

The second CP 413a may determine a weight vector for the second antenna 411 and apply the weight vector to the second antenna 411.

The second CP 413a may identify, based on a communication signal received by the second communication circuit 413, information (e.g., a UL channel matrix) about a channel environment via which the communication signal is transferred. The second CP 413a may identify a specific field (e.g., an LTF) of the received communication signal to identify (or estimate) the information (e.g., the UL channel matrix) (hereinafter, referred to as second channel information) about the channel environment via which the communication signal is transferred. The second CP 413a may estimate a DL channel matrix from the UL channel matrix. Estimating the DL channel matrix from the UL channel matrix may be described as implicit channel estimation. The second CP 413a may transmit the identified second channel information (e.g., the UL channel matrix) to the second processor 415.

The second CP 413a may control the second communication circuit 413 to perform CCA. Before transmitting a communication signal, the second CP 413a may perform CCA for identifying whether a wireless medium via which the communication signal is to be transmitted is occupied or is likely to be occupied by another electronic device. For example, CCA may be performed with a signal detection scheme for identifying a preamble of the communication signal transmitted via the wireless medium and/or an energy detection scheme for identifying strength of the communication signal transmitted via the wireless medium.

If it is identified that the wireless medium is occupied by an external electronic device (e.g., is in a busy state), the second CP 413a may delay transmission of the communication signal. The second CP 413a may identify identification information of a BSS included in an HE-SIG-A field of a received communication signal according to a CCA result, and identify whether the received communication signal is a communication signal received from an external electronic device which did not establish a communication connection (e.g., composes a different BSS) with the second electronic device 403. If it is identified that the received communication signal is the communication signal received from the external electronic device that did not establish the communication connection, the second CP 413a may delay transmission of a communication signal. If it is identified that the wireless medium is not occupied by the other electronic device (e.g., is in an idle state), the second CP 413a may perform transmission of a communication signal. If it is identified that the received communication signal is not the communication signal received from the external electronic device that did not establish the communication connection with the second electronic device 403 based on the identification information of the BSS included in the HE-SIG-A field of the received communication signal according to the CCA result, the second CP 413a may identify that the wireless medium is not occupied by the external electronic device.

When the wireless medium is not occupied by the external electronic device, the second CP 413a may perform a random delay wait and then transmit a communication signal. The second CP 413a may control the second communication circuit 413 to receive, from an external electronic device (e.g., a client) included in the same BSS, information indicating whether a first TWT service period of an external electronic device included in the same BSS is protected by an external electronic device (e.g., an AP) included in a neighboring BSS. The second CP 413a may control the second communication circuit 413 to transmit, to an external electronic device (e.g., a client) included in the same BSS, information indicating whether a second TWT service period of an external electronic device included in the same BSS is protected by an external electronic device (e.g., an AP) included in a neighboring BSS. If it is identified that the first TWT service period of the external electronic device included in the same BSS is protected by the external electronic device included in the neighboring BSS, the second CP 413a may suspend performance of a CCA operation and transmit a communication signal to the outside during the first TWT service period, regardless of whether the wireless medium is occupied by the other electronic device.

All or some of the operations of the second CP 413a described above may be performed by the second processor 415.

The second antenna 411 may transmit a signal from the second communication circuit 413 to the outside or may transfer a signal received from the outside to the second communication circuit 413. The second antenna 411 may include at least one of antennas 411-1, 411-2, . . . , and 411-n. The antennas 411-1, 411-2, . . . , and/or 411-n may be used for spatial multiplexing and/or channel estimation. If a part of the antennas 411-1, 411-2, . . . , and/or 411-n is used for the channel estimation, a remaining part of the antennas 411-1, 411-2, . . . , and/or 411-n may be used for the spatial multiplexing. The number (n) of antennas included in the second antenna 411 may be greater than or equal to the number (m) of antennas included in the first antenna 409. A weight vector may be applied to the antennas 411-1, 411-2, . . . , and/or 411-n in the second antenna 411.

During a DL service period of the second electronic device 403, a first weight vector may be applied to the antennas 411-1, 411-2, . . . , and/or 411-n in the second antenna 411. During a UL service period of the second electronic device 403, a second weight vector may be applied to the antennas 411-1, 411-2, . . . , and/or 411-n in the second antenna 411. The first weight vector may be variable within the DL service period of the second electronic device 403. For example, the first weight vector may vary over time based on first TWT information which corresponds to one or more external electronic devices affected by signal interference within the DL service period of the second electronic device 403. The second weight vector may also vary over time based on second TWT information that corresponds to one or more external electronic devices that generate signal interference within a UL service period of the second electronic device 403.

A method of determining a weight vector for the at least one antenna in the second antenna 411 or applying a weight vector to at the least one antenna in the second antenna 411 in the second electronic device 403 may be performed by the first electronic device 401. The first processor 405 or the first CP 407a of the first electronic device 401 may identify first channel information for an electronic device that is affected by signal interference and/or second channel information for an electronic device that generates signal interference, and determine a weight vector for the antennas 409-1, 409-2, . . . , and/or 409-m in the first antenna 409 or apply the weight vector to the at least one antenna 409-1, 409-2, . . . , or 409-m in the first antenna 409 based on first TWT information for the electronic device that is affected by the signal interference and/or second TWT information for the electronic device that generates the signal interference.

Figure 5A:
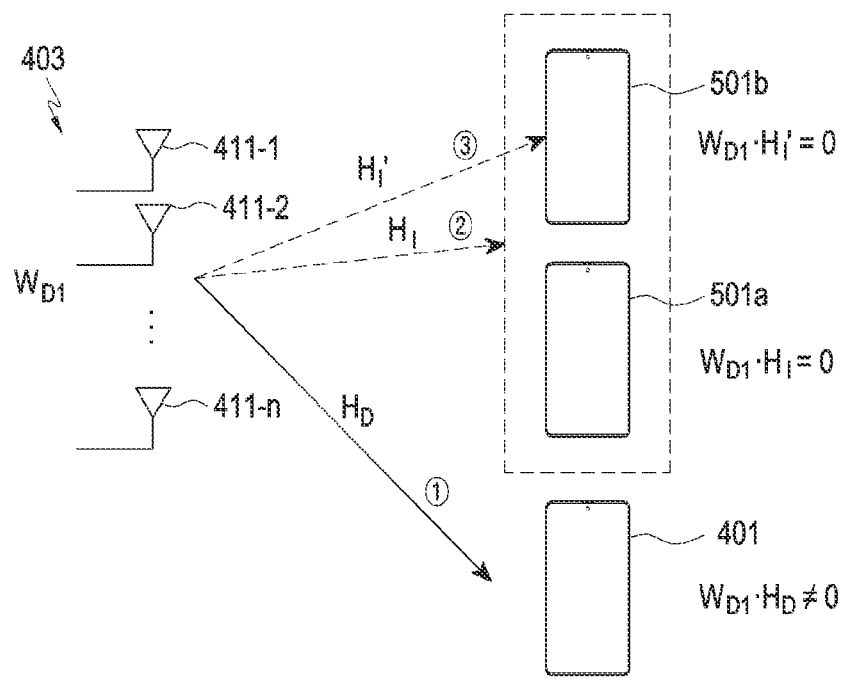
FIG. 5A illustrates a method of determining a first weight vector based on a downlink channel matrix in an electronic device according to an embodiment.
Figure 5B:
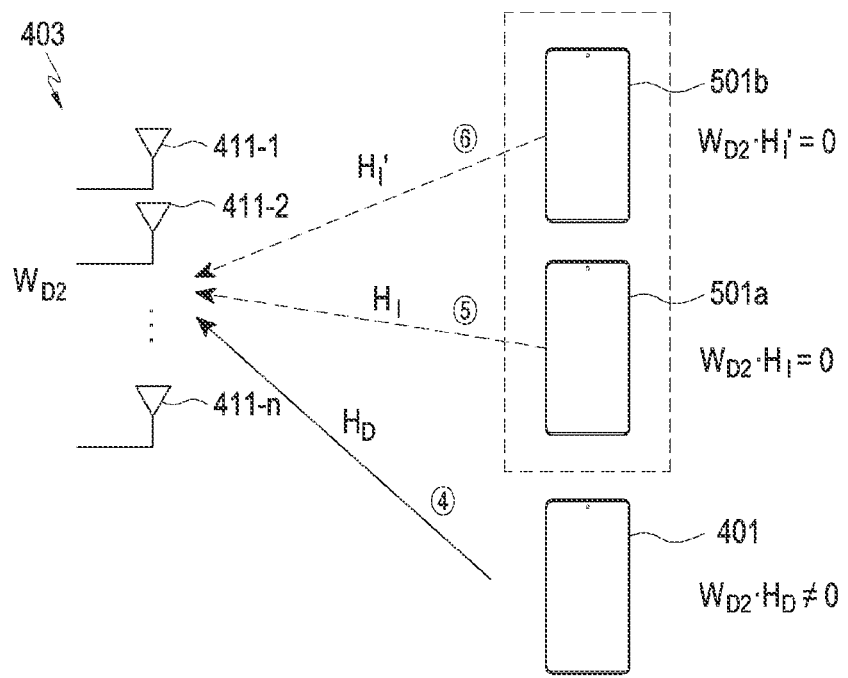
FIG. 5B illustrates a method of determining a second weight vector based on an uplink channel matrix in an electronic device according to an embodiment.

FIG. 5A illustrates a method of determining a first weight vector based on a DL channel matrix in an electronic device according to an embodiment. FIG. 5B illustrates a method of determining a second weight vector based on a UL channel matrix in an electronic device according to an embodiment.

For example, FIGS. 5A and 5B will be described below with reference to the first electronic device 401 and the second electronic device 403 of FIG. 4, wherein the second electronic device 403 is an AP and the first electronic device 401 is a client of the second electronic device 403 in the same BSS.

Referring to FIGS. 5A and 5B, a first external electronic device 501a and a second external electronic device 501b may be clients of one or more other APs whose Wi-Fi communication connection is established with one or more other Aps, different from the second electronic device 403.

Referring to FIG. 5A, during a DL service period (e.g., a first period), the second electronic device 403 transmits a communication signal via a second antenna (e.g., at least one of antennas 411-1, 411-2, . . . , and 411-n). The communication signal transmitted by the second electronic device 403 may be transferred to the first and second external electronic devices 501a and 501b as well as the first electronic device 401.

The second electronic device 403 may perform a channel sounding operation on the first electronic device 401, the first external electronic device 501a, and the second external electronic device 501b to identify first channel information (e.g., a DL channel matrix) of each of the first electronic device 401, the first external electronic device 501a, and the second external electronic device 501b.

$H_D$ is a DL channel matrix that corresponds to a communication signal (①) transferred from the second electronic device 403 to the first electronic device 401. $H_I$ is a DL channel matrix that corresponds to a communication signal (②) transferred from the second electronic device 403 to the first external electronic device 501a. $H_I'$ is a DL channel matrix that corresponds to a communication signal (③) transferred from the second electronic device 403 to the second external electronic device 501b. Channel environments (e.g., propagation environments) via which the communication signals ① to ③ are transferred are different, so the DL channel matrices may have different values. The DL channel matrices may be defined in Equations (1), (2), and (3).

$$H_D = [H_{D,1} \ldots H_{D,n}]^T \quad (1)$$

$$H_I = [H_{I,1} \ldots H_{I,n}]^T \quad (2)$$

$$H_I' = [H_{I,1}' \ldots H_{I,n}']^T \quad (3)$$

In Equations (1) to (3), n denotes the number of at least one antenna in a second antenna (e.g., a second antenna 411 in FIG. 4) of the second electronic device 403, and T denotes a transpose operator. $H_{D,n}$, which is an n-th element in Equation (1), denotes a DL channel via which the communication signal (①) is transferred from an n-th antenna 411-n in the second electronic device 403 to the first electronic device 401. $H_{I,n}$, which is an n-th element in Equation (2), denotes a DL channel via which the communication signal (②) is transferred from the n-th antenna 411-n in the second electronic device 403 to the first external electronic device 501a. $H_{I,n}'$, which is an n-th element in Equation (3), denotes a DL channel via which the communication signal (③) is transferred from the n-th antenna 411-n in the second electronic device 403 to the second external electronic device 501b.

The second electronic device 403 may determine a first weight vector $W_{D1}$ using Equations (4) to (7).

$$W_{D1} = [W_{D1,1} \cdots W_{D1,n}] \tag{4}$$

$$W_{D1} \cdot H_I = 0 \tag{5}$$

$$W_{D1} \cdot H_I' = 0 \tag{6}$$

$$W_{D1} \cdot H_D \neq 0 \tag{7}$$

In Equation (4), n denotes the number of the at least one antenna in the second antenna (e.g., the second antenna 411 in FIG. 4) of the second electronic device 403, and an n-th element $W_{D1,n}$ denotes a weight value for the n-th antenna 411-n of the second electronic device 403. The operator "·" in Equations (5) to (7) denotes a matrix product operator.

The second electronic device 403 may determine the first weight vector $W_{D1}$ by performing a matrix product operation in Equations (5) to (7).

A communication signal transmitted via the at least one of antennas 411-1, 411-2, ..., or 411-n of the second electronic device 403 may be expressed in a form of a matrix product of the first weight vector $W_{D1}$ in Equation (4) and a DL channel matrix (e.g., $H_D$, $H_I$, or $H_I'$), which corresponds to each of the at least one antenna 411-1, 411-2, ..., or 411-n. If the second electronic device 403 applies the first weight vector $W_{D1}$, which satisfies Equations (5) to (7), to the at least one of antenna 411-1, 411-2, ..., or 411-n and transmits a communication signal, the communication signal may be transferred to the first electronic device 401 without generating signal interference to the first and second external electronic devices 501a and 501b.

Referring to FIG. 5B, during a UL service period (e.g., a second period), the second electronic device 403 may receive a communication signal via the second antenna (e.g., at least one of antennas 411-1, 411-2, ..., and 411-n). The second electronic device 403 may receive a communication signal from the first and second external electronic devices 501a and 501b as well as the first electronic device 401.

The second electronic device 403 may identify a specific field (e.g., an LTF) in each of the communication signals received from the first electronic device 401, the first external electronic device 501a, and the second external electronic device 501b to identify second channel information (e.g., an UL channel matrix) of each of the first electronic device 401, the first external electronic device 501a, and the second external electronic device 501b. $H_D$ is a UL channel matrix which corresponds to a communication signal (④) transferred from the first electronic device 401 to the second electronic device 403. $H_I$ is a UL channel matrix that corresponds to a communication signal (⑤) transferred from the first external electronic device 501a to the second electronic device 403. $H_I'$ is a UL channel matrix that corresponds to a communication signal (⑥) transferred from the second external electronic device 501b to the second electronic device 403. Channel environments via which the communication signals ④ to ⑥ are transferred are different, so the UL channel matrices may have different values. The UL channel matrices may be defined using Equations (1), (2), and (3) above.

In FIG. 5B, $H_{D,n}$, which is an n-th element of Equation (1), denotes a UL channel via which the communication signal (④) is received from the first electronic device 401 to the n-th antenna 411-n of the second electronic device 403. $H_{I,n}$, which is an n-th element of Equation (2), denotes a UL channel via which the communication signal (⑤) is received from the first external electronic device 501a to the n-th antenna 411-n of the second electronic device 403. $H_{I,n}'$, which is an n-th element of Equation (3), denotes a UL channel via which the communication signal (⑥) is received from the second external electronic device 501b to the n-th antenna 411-n of the second electronic device 403.

The second electronic device 403 may determine a second weight vector $W_{D2}$ using Equations (8) to (11) below.

$$W_{D2} = [W_{D2,1} \cdots W_{D2,n}] \tag{8}$$

$$W_{D2} \cdot H_I = 0 \tag{9}$$

$$W_{D2} \cdot H_I' = 0 \tag{10}$$

$$W_{D2} \cdot H_D \neq 0 \tag{11}$$

In Equation (8), n denotes the number of second antennas, and an n-th element $W_{D2,n}$ denotes a weight value for the n-th antenna 411-n of the second electronic device 403. The operator "·" in Equations (9) to (11) denotes a matrix product operator.

The second electronic device 403 may determine the second weight vector $W_{D2}$ by performing a matrix product operation in Equations (9) to (11).

A communication signal received via the at least one antenna 411-1, 411-2, ..., or 411-n of the second electronic device 403 may be expressed in a form of a matrix product of the second weight vector $W_{D2}$ in Equation (8) and an UL channel matrix (e.g., $H_D$, $H_I$, or $H_I'$), which corresponds to each of the at least one antenna 411-1, 411-2, ..., or 411-n). If the second electronic device 403 applies the second weight vector $W_{D2}$ that satisfies Equations (9) to (11) to the at least one antenna 411-1, 411-2, ..., or 411-n, a communication signal from the first electronic device 401 may be received without signal interference due to communication signals from the first and second external electronic devices 501a and 501b.

As described above with reference to FIGS. 5A and 5B, if the second electronic device 403 identifies a DL channel matrix and/or a UL channel matrix for the first electronic device 401, and a DL channel matrix and/or a UL channel matrix for one or more external electronic devices (e.g., the first and second external electronic devices 501a and 501b), signal interference may not be generated in relation to BSSs located nearby. However, it is required to identify a DL channel matrix and/or a UL channel matrix for one or more external electronic devices included in neighboring BSSs as well as the first electronic device 401. Further, if a channel environment changes, e.g., due to movement of external electronic devices, a burden of identifying a DL channel matrix and/or a UL channel matrix for external electronic devices included in a neighboring BSS in real time may occur.

Figure 6A:
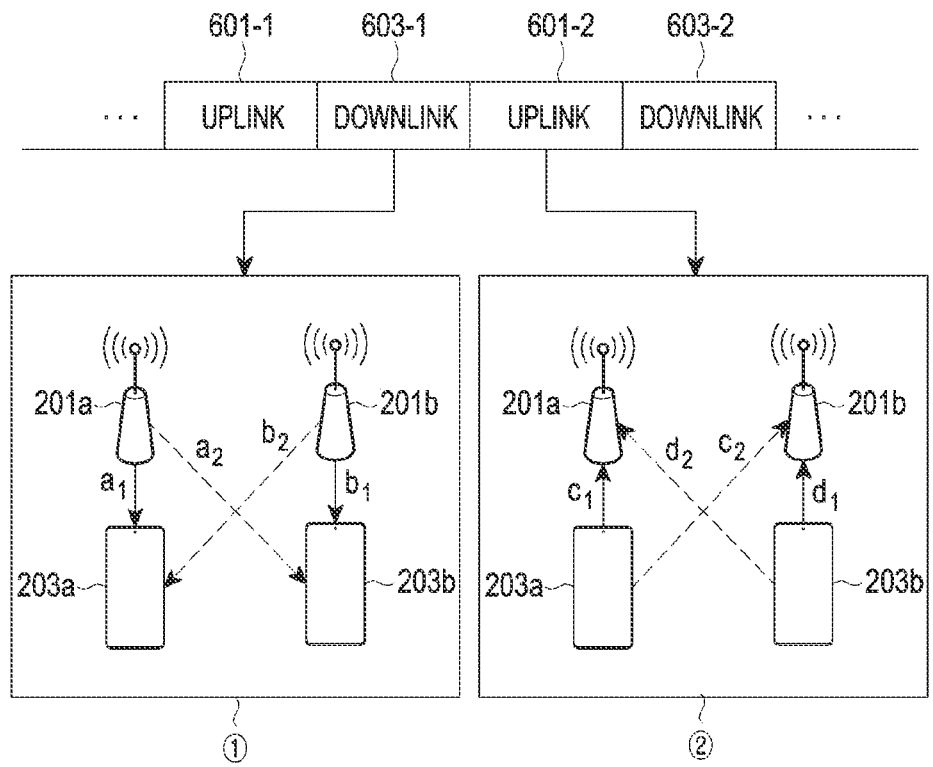
FIG. 6A illustrates a method of synchronizing uplink service periods and downlink service periods of a plurality of BSSs according to an embodiment.

FIG. 6A illustrates a method of synchronizing UL service periods and DL service periods of a plurality of BSSs according to an embodiment.

Referring to FIG. 6A, DL service periods and UL service periods of a first BSS including a first AP 201a and a first device 203a and a second BSS including a second AP 201b and a second device 203b may be different. For example, as illustrated in FIG. 3C, while the first AP 201a and the first device 203a operate in a DL operation mode, the second AP 201b and the second device 203b may operate in an link operation mode. While receiving a communication signal a1 transmitted by the first AP 201a, the first device 203a may also receive a communication signal d3 transmitted by the second device 203b, so signal interference from the second device 203b may occur. If the first device 203a applies a second weight vector to a first antenna by applying a method described above with reference to FIG. 5B, the signal interference from the second device 203b may be alleviated. However, for determining the second weight vector, the first device 203a needs to identify first channel information of the first AP 201a and second channel information of the second device 203b, requiring the first device 203a to use time and/or antenna resources used for spatial multiplexing for identifying channel environment information. When first device 203a is a portable electronic device (e.g., a mobile phone), the first device 203a may not include a large number of antennas due to restrictions due to a design, a size, etc., an element of the second weight vector corresponds to the number of antennas, so it may be difficult to determine the second weight vector which satisfies Equations (8) to (11) above. While receiving a communication signal d1 transmitted by the second device 203b, the second AP 201b may receive a communication signal a3 transmitted by the first AP 201a, so signal interference from the first AP 201b may occur. While the second AP 201b may identify first channel information of the first AP 201a in order to alleviate signal interference due to the communication signal a3 transmitted by the first AP 201a, in a congested environment where a large number of APs and a large number of devices are located, a burden of using time and/or antenna resources may occur to identify channel environment information of not only devices in a neighboring BSS but also APs in the neighboring BSS.

Referring to FIG. 6A, the first device 203a may be a client of the first AP 201a, and the first device 203a and the first AP 201a may compose a first BSS. The second device 203b may be a client of the second AP 201b, and the second device 203b and the second AP 201b may compose a second BSS.

A UL service period of the first BSS and a UL service period of the second BSS may be synchronized to an UL service period 601-1, 601-2, . . . . A DL service period of the first BSS and a DL service period of the second BSS may be synchronized to a DL service period 603-1, 603-2, . . . . If the UL service periods of the first and second BSSs are synchronized, while the first device 203a and the first AP 201a operate in the UL operation mode, the second device 203b and the second AP 201b may also operate in the UL operation mode. If the DL service periods of the first and second BSSs are synchronized, while the first device 203a and the first AP 201a operate in the DL operation mode, the second device 203b and the second AP 201b may also operate in the DL operation mode.

In state ① in FIG. 6A, the DL service periods of the first BSS and the second BSS are synchronized, e.g., as illustrated in FIG. 3A. In state ① in FIG. 6A, signal interference may be alleviated according to the methods described with reference to FIGS. 4 and 5A. For example, the first device 203a may identify a communication signal b2 transmitted by the second AP 201b to identify that the second AP 201b is an electronic device that generates signal interference. The first device 203a may transmit a first control signal to the second AP 201b to cause the second AP 201b to perform a channel sounding operation. The second AP 201b may identify first channel information for the first device 203a and first channel information for the second device 203b, apply a first weight vector to antennas of the second AP 201b, and then transmit a communication signal. The communication signal b2 may be expressed in a form of a matrix product according to Equation (5) or Equation (6), and the first device 203a may receive a communication signal a1 in a state in which signal interference due to the communication signal b2 is alleviated.

In state ② in FIG. 6A, the UL service periods of the first BSS and the second BSS are synchronized, e.g., as illustrated in FIG. 3B. In state 2) in FIG. 6A, signal interference may be alleviated according to methods described above with reference to FIGS. 4 and 5B. For example, the first AP 201a may identify a communication signal d2 transmitted by the second device 203b to identify that the second device 203b is an electronic device which generates signal interference. The first AP 201a may identify a specific field (e.g., an LTF) of the communication signal c1 and a specific field (e.g., an LTF) of the communication signal d2 to identify second channel information for the first device 203a and second channel information for the second device 203b. The first AP 201a may apply a second weight vector to antennas of the first AP 201a based on the second channel information for the first device 203a and the second channel information for the second device 203b.

As described above, if a UL service period and/or a DL service period of a first BSS and a UL service period and/or a DL service period of a second BSS are synchronized with each other, a problem as described using FIG. 3C does not occur, and the first AP 201a and/or the second AP 201b, which may have more antennas than devices, may determine a first weight vector and a second weight vector, thereby alleviating signal interference between neighboring BSSs.

Figure 6B:
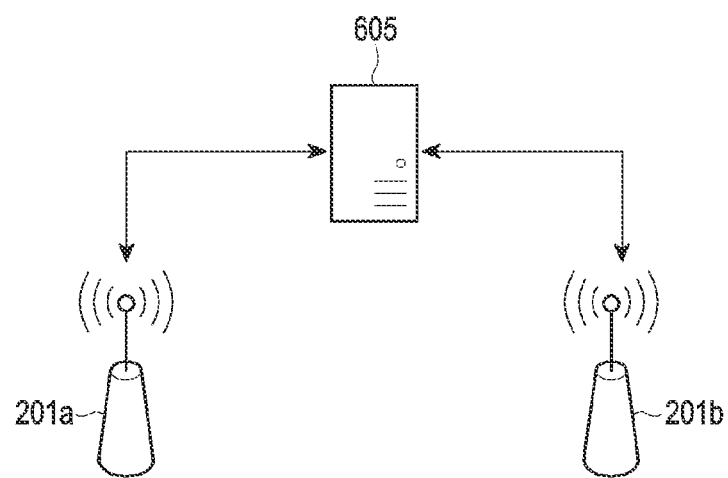
FIG. 6B illustrates a method of synchronizing uplink service periods and downlink service periods of a plurality of BSSs according to an embodiment.

FIG. 6B illustrates a method of synchronizing UL service periods and DL service periods of a plurality of BSSs according to an embodiment.

Referring to FIG. 6B, a first AP 201a, a second AP 201b, and an access point (AP) controller 605 are illustrated. The first AP 201a may compose a first BSS, the second AP 201b may compose a second BSS, and a coverage of the first BSS and a coverage of the second BSS may at least partially overlap.

The AP controller 605 may determine a synchronized UL service period and a synchronized DL service period for the first AP 201a and the second AP 201b, and transmit a synchronization signal wirelessly and/or wiredly to the first AP 201a and the second AP 201b. The synchronization signal may indicate a synchronized UL service period and a synchronized DL service period for the first and second BSSs. For example, the synchronization signal may include information indicating at least one of a start time point, an end time point, or a length (or a period) of each of the synchronized UL service period and the synchronized DL service period.

The AP controller 605 may monitor information about UL traffic and DL traffic in the first BSS and information about UL traffic and DL traffic in the second BSS. The AP controller 605 may variably determine a length ratio of a synchronized UL service period to a synchronized DL service period based on the monitored result. If a sum of the DL traffic of the first and second BSSs is greater than a sum of the UL traffic of the first and second BSSs, the length of the synchronized DL service period may be determined to be longer than the length of the synchronized UL service period.

If a large number of BSSs are adjacent to each other, the AP controller 605 may group the BSSs and transmit a synchronization signal for each group. For example, if a first BSS, a second BSS, and a third BSS are located adjacent to each another, signal interference may occur between the first BSS and the second BSS, but not between the first BSS or the second BSS and the third BSS, or relatively small signal interference may occur between the first BSS or the second BSS and the third BSS. In this case, the AP controller 605 may transmit a synchronization signal only to an AP of the first BSS and an AP of the second BSS so that UL service periods and DL service periods of the first BSS and the second BSS coincide with each other.

If a first BSS, a second BSS, a third BSS, and a fourth BSS are located adjacent to each another, signal interference may occur between the first BSS and the second BSS, and signal interference may occur between the third BSS and the fourth BSS. However, signal interference may not occur between the first BSS or the second BSS and the third BSS or the fourth BSS, or relatively small signal interference may occur between the first BSS or the second BSS and the third BSS or the fourth BSS. In this case, the AP controller 605 may transmit a first synchronization signal to an AP of the first BSS and an AP of the second BSS, and transmit a second synchronization signal to an AP of the third BSS and an AP of the fourth BSS. The AP of the first BSS and the AP of the second BSS may be configured based on the first synchronization signal so that UL service periods and DL service periods of the first BSS and the second BSS coincide with each other, and the AP of the third BSS and the AP of the fourth BSS may be configured based on the second synchronization signal so that UL service periods and DL service periods of the third BSS and the fourth BSS coincide with each other.

The AP controller 605 may synchronize UL service periods and DL service periods only while signal interference occurs between neighboring BSSs. Upon receiving, from an electronic device (e.g., an AP or a device) included in the first BSS or the second BSS, interference information indicating that signal interference occurs, the AP controller 605 may synchronize UL service periods and DL service periods, respectively, if it is identified that signal interference between the first BSS and the second BSS is greater than or equal to a predetermined value. The AP controller 605 may periodically transmit a synchronization signal if the interference information is received. If the interference information is not received, the AP controller 605 may wait for designated time, and after the designated time elapses, suspend transmission of the synchronization signal.

Sharing TWT information between the first BSS and the second BSS may be performed by the AP controller 605. For example, the AP controller 605 may receive, from an electronic device included in the first BSS, first TWT information and/or second TWT information of a client, and may receive, from an electronic device included in the second BSS, first TWT information and/or second TWT information of a client. The AP controller 605 may transmit first TWT information and/or second TWT information received from one BSS to one or more other BSSs.

All or some of the operations of the AP controller 605 described above may be performed by one AP. For example, if a plurality of BSSs are located adjacent to each other, an AP included in one BSS may perform the operations of the AP controller 605 described above to synchronize UL service periods and DL service periods of the plurality of BSSs, respectively. The first AP 201a may determine a UL service period and a DL service period of the first BSS. The first AP 201a may set and request the UL service period and the DL service period of the first BSS from at least one device included in the first BSS, and receive confirmation from the at least one device included in the first BSS.

The first AP 201a may receive, from the at least one device included in the first BSS, a request for setting the UL service period and the DL service period of the first BSS and identify (or set) the UL service period and the DL service period. Setting of the UL service period and the DL service period of the first BSS may include setting of information about wake time, a period, and/or a length of the at least one device included in the first BSS. The first AP 201a may transmit a synchronization signal indicating the determined UL service period and DL service period of the first BSS, wired and/or wirelessly, to an AP (e.g., the second AP 201b) included in another BSS.

The second AP 201b may determine a UL service period and a DL service period of the second BSS based on the received synchronization signal. The second AP 201b may set the UL service period and the DL service period of the second BSS based on the received synchronization signal to coincide with the UL service period and the DL service period of the first BSS. Setting of the UL service period and the DL service period of the second BSS may include setting of information about a wake time, a period, and/or a length of at least one device included in the second BSS. The second AP 201b may transmit, to the at least one device included in the second BSS, the determined UL service period and DL service period of the second BSS, and receive confirmation from the at least one device included in the second BSS. As described above, the first AP 201a which performs the operations of the AP controller 605 may be described as an owner of a coordination group, and the owner may be determined and/or changed according to negotiation between a plurality of APs. If an environment of the first BSS to which the first AP 201a belongs or an environment of the second BSS to which the second AP 201b belongs changes, the first AP 201a or the second AP 201b may request to change a UL service period and a DL service period. A change in an environment of a BSS may include a change in the number of devices that belong to the BSS and/or movement of an AP or a device.

Figure 7:
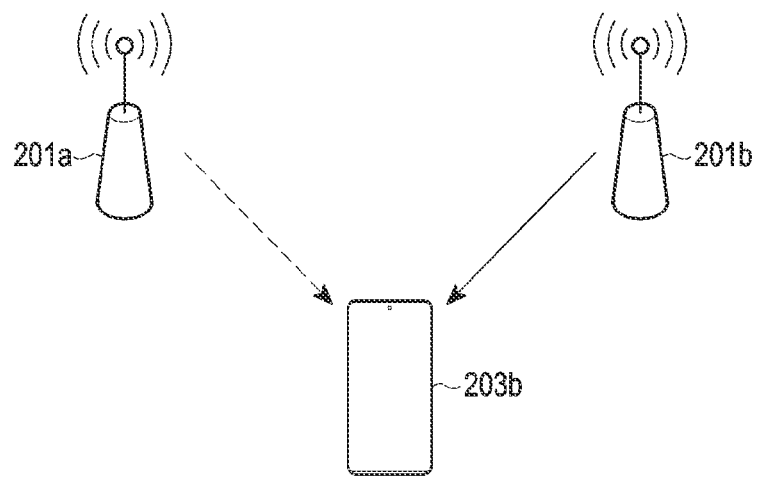
FIG. 7 illustrates a method of alleviating signal interference during a downlink service period according to an embodiment.

FIG. 7 illustrates a method of alleviating signal interference during a DL service period according to an embodiment.

Referring to FIG. 7, a second device 203b, a first AP 201a, and a second AP 201b are illustrated. The second device 203b may be a client of the second AP 201b, and the second device 203b and the second AP 201b may compose a second BSS. The first AP 201a may compose a first BSS together with a client different from the second device 203b.

A UL service period and a DL service of the first BSS to which the first AP 201a belongs may be synchronized with and an UL service period and a DL service of the second BSS to which the second AP 201b belongs. The second device 203b may be affected by signal interference due to a communication signal transmitted by the first AP 201a included in a neighboring BSS during a DL service period.

The first AP 201a, which generates signal interference, may perform channel sounding for a first device (e.g., the first device 203a of FIG. 5A) and the second device 203b to alleviate signal interference to the second device 203b. The first AP 201a may transmit a reference signal to the second device 203b to identify first channel information for the second device 203b.

Referring to FIG. 7, within a DL service period, a CP (e.g., a first CP 407a in FIG. 4) of the second device 203b may be in an awake state during a first TWT service period, and be in a doze state during time which is not the first TWT service period. The second device 203b may not receive a reference signal transmitted by the first AP 201a in the doze state. In this case, the first AP 201a may repeatedly transmit the reference signal in order to receive a response signal that corresponds to channel sounding from the second device 203b. If the first AP 201a is able to identify a first TWT service period of the second device 203b within the DL service period, the first AP 201a may transmit the reference signal for the channel sounding within the first TWT service period, and receive, from the second device 203b, first channel information for the second device 203b based on a response to the reference signal.

Figure 8:
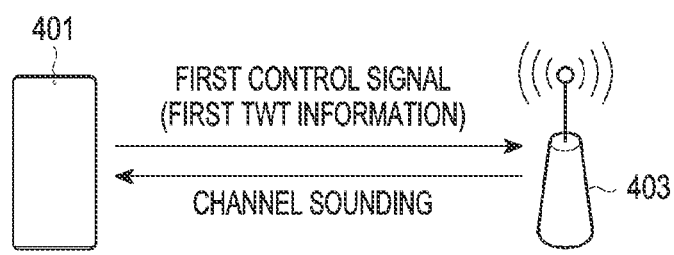
FIG. 8 illustrates a first protocol for alleviating signal interference during a downlink service period according to an embodiment.

FIG. 8 illustrates a first protocol for alleviating signal interference during a DL service period according to an embodiment.

Referring to FIG. 8, if an AP that generates signal interference to a device is able to identify a first TWT service period of the device that is affected by the signal interference, the AP may efficiently perform channel sounding.

More specifically, a first electronic device 401 (e.g., a second device 203b in FIG. 7) may transmit a first control signal to a second electronic device 403 (e.g., a first AP 201a in FIG. 7). The first control signal may include an action frame which causes the second electronic device 403 that receives the first control signal to perform a specific operation (e.g., a channel sounding operation). The first control signal may include first TWT information of the first electronic device 401. The first TWT information may include information about a wake time, a period, and/or a length of the first TWT service period of the first electronic device 401 within a DL service period. The first TWT information may be included in a specific field (e.g., a TWT information field) of the action frame and transmitted to the second electronic device 403.

If the first control signal is received from the first electronic device 401, the second electronic device 403 may perform channel sounding for the first electronic device 401. The second electronic device 403 may transmit a reference signal for channel sounding to the first electronic device 401 during the first TWT service period of the first electronic device 401 based on the first TWT information included in the first control signal and receive first channel information of the first electronic device 401 in response to the reference signal.

Figure 9A:
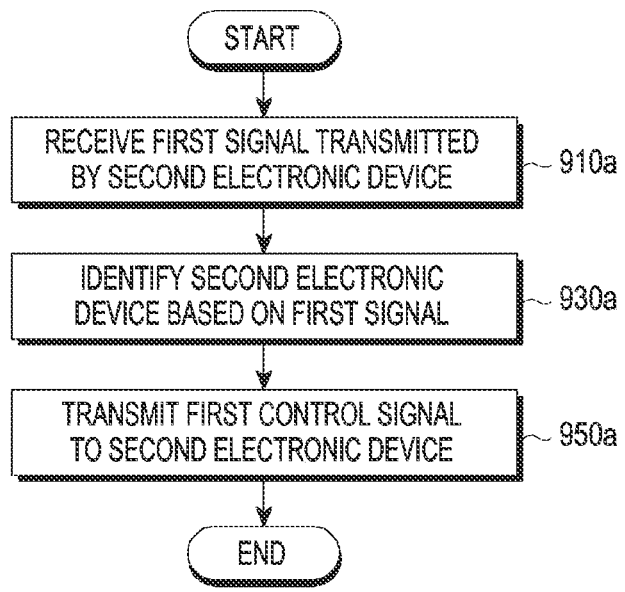
FIG. 9A is a flowchart illustrating an operation of a first electronic device based on a first protocol according to an embodiment.

FIG. 9A is a flowchart illustrating an operation of a first electronic device (e.g., a first electronic device 401 in FIG. 4) based on a first protocol according to an embodiment.

Referring to FIG. 9A, a first electronic device may be affected by signal interference from a second electronic device (e.g., a second electronic device 403 in FIG. 4). For example, the first electronic device may be the second device 203b illustrated in FIG. 7 and the second electronic device may be the first AP 201a illustrated in FIG. 7.

In step 910a, the first electronic device receives a first signal transmitted by the second electronic device. The first signal may be a packet transmitted by the second electronic device. The first signal may be a packet that the first electronic device receives from the second electronic device during a DL service period.

In step 930a, the first electronic device identifies the second electronic device based on the first signal. The first electronic device may identify specific information (e.g., address information) in a MAC header of the first signal to identify the second electronic device that transmits the first signal. The first electronic device may identify that the identified second electronic device is an external electronic device that did not establish a communication connection with the first electronic device. The first electronic device may identify that the second electronic device is not included in the same BSS. The first electronic device may identify that the identified second electronic device is an external electronic device that generates signal interference.

In step 950a, the first electronic device transmits a first control signal to the second electronic device. The first electronic device may transmit the first control signal to the second electronic device based on the specific information (e.g., the address information) in the MAC header of the received first signal. The first control signal may include first TWT information of the first electronic device. The first electronic device may transmit the first control signal, thereby causing the second electronic device to perform a channel sounding operation corresponding to the first TWT service period of the first electronic device during a DL service period.

Figure 9B:
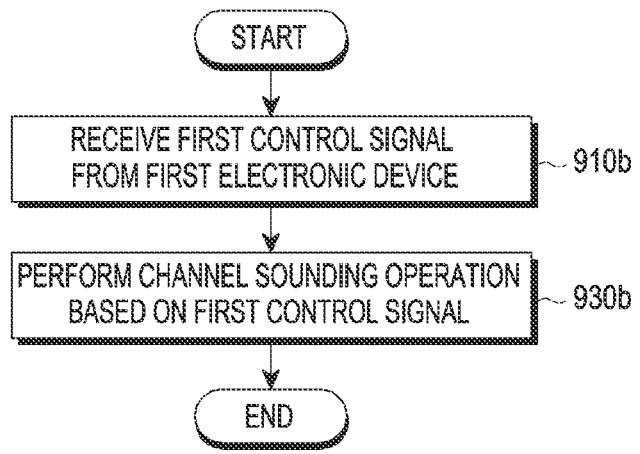
FIG. 9B is a flowchart illustrating an operation of a second electronic device based on a first protocol according to an embodiment.

FIG. 9B is a flowchart illustrating an operation of a second electronic device (e.g., a second electronic device 403 in FIG. 4) based on a first protocol according to an embodiment.

Referring to FIG. 9B, a first electronic device (e.g., a first electronic device 401 in FIG. 4) may be affected by signal interference from the second electronic device. For example, the first electronic device may be the second device 203b illustrated in FIG. 7, and the second electronic device 403 may be the first AP 201a illustrated in FIG. 7.

In step 910b, the second electronic device receives a first control signal from the first electronic device. The first control signal may include first TWT information of the first electronic device. The first control signal may include information for requesting the second electronic device to perform a channel sounding operation based on the first TWT information during a DL service period.

In step 930b, the second electronic device performs a channel sounding operation based on the first control signal. The second electronic device may perform the channel sounding operation for the first electronic device that transmits the first control signal in response to receiving the first control signal. The second electronic device may identify first TWT information of the first electronic device included in the first control signal. The second electronic device may identify the first TWT information of the first electronic device, thereby performing the channel sounding operation during the DL service period corresponding to a first TWT service period of the first electronic device.

Figure 10:
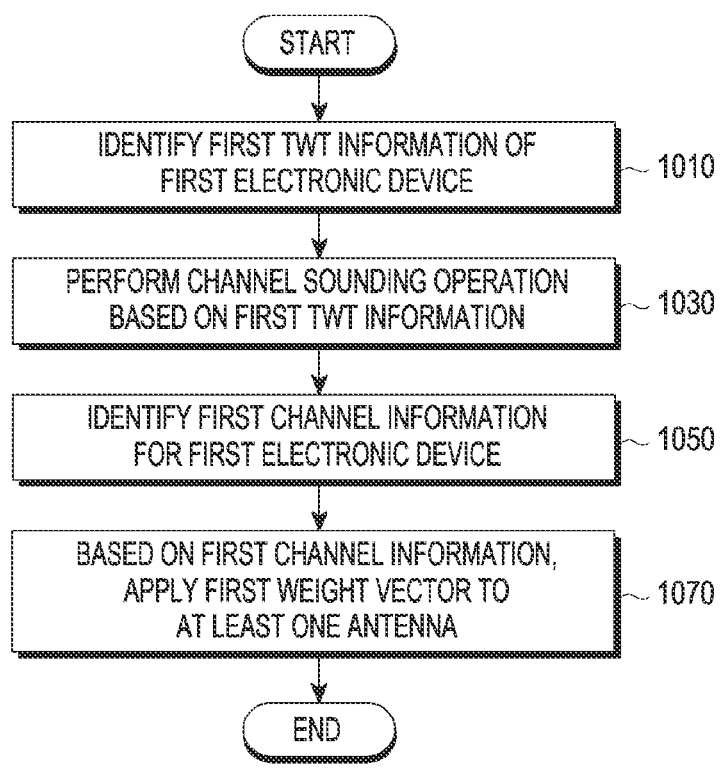
FIG. 10 is a flowchart illustrating a method for alleviating signal interference based on first TWT information in a second electronic device according to an embodiment.

FIG. 10 is a flowchart illustrating a method for alleviating signal interference based on first TWT information in a second electronic device (e.g., a second electronic device 403 in FIG. 4) according to an embodiment.

Referring to FIG. 10, a first electronic device (e.g., a first electronic device 401 in FIG. 4) may be affected by signal interference from the second electronic device. For example, the first electronic device 401 may be the second device 203b illustrated in FIG. 7, and the second electronic device 403 may be the first AP 201a illustrated in FIG. 7.

In step 1010, the second electronic device identifies first TWT information of the first electronic device. The second electronic device may receive a first control signal from the first electronic device to identify first TWT information of the first electronic device.

In step 1030, the second electronic device performs a channel sounding operation based on the first TWT information. The second electronic device may perform the channel sounding operation for the first electronic device corresponding to a first TWT service period of the first electronic device during a DL service period.

In step 1050, the second electronic device identifies first channel information for the first electronic device. The second electronic device may receive, from the first electronic device, a response signal including first channel information in response to the channel sounding operation performed for the first electronic device. For example, the second electronic device may transmit, to the first electronic device, a reference signal for performing a channel sounding operation, and receive the response signal to the reference signal from the first electronic device to identity the first channel information of the first electronic device.

In step 1070, the second electronic device applies a first weight vector to at least one antenna (at least one of antennas 411-1, 411-2, ..., and 411-n in FIG. 4) of a second antenna (e.g., a second antenna 411 in FIG. 4) based on the first channel information. The second electronic device may alleviate signal interference to the first electronic device by transmitting a communication signal utilizing the first weight vector. For example, the second electronic device may transmit the communication signal in a state in which the first weight vector is applied corresponding to a first TWT service period of the first electronic device during a DL service period, thereby alleviating the signal interference to the first electronic device.

Figure 11:
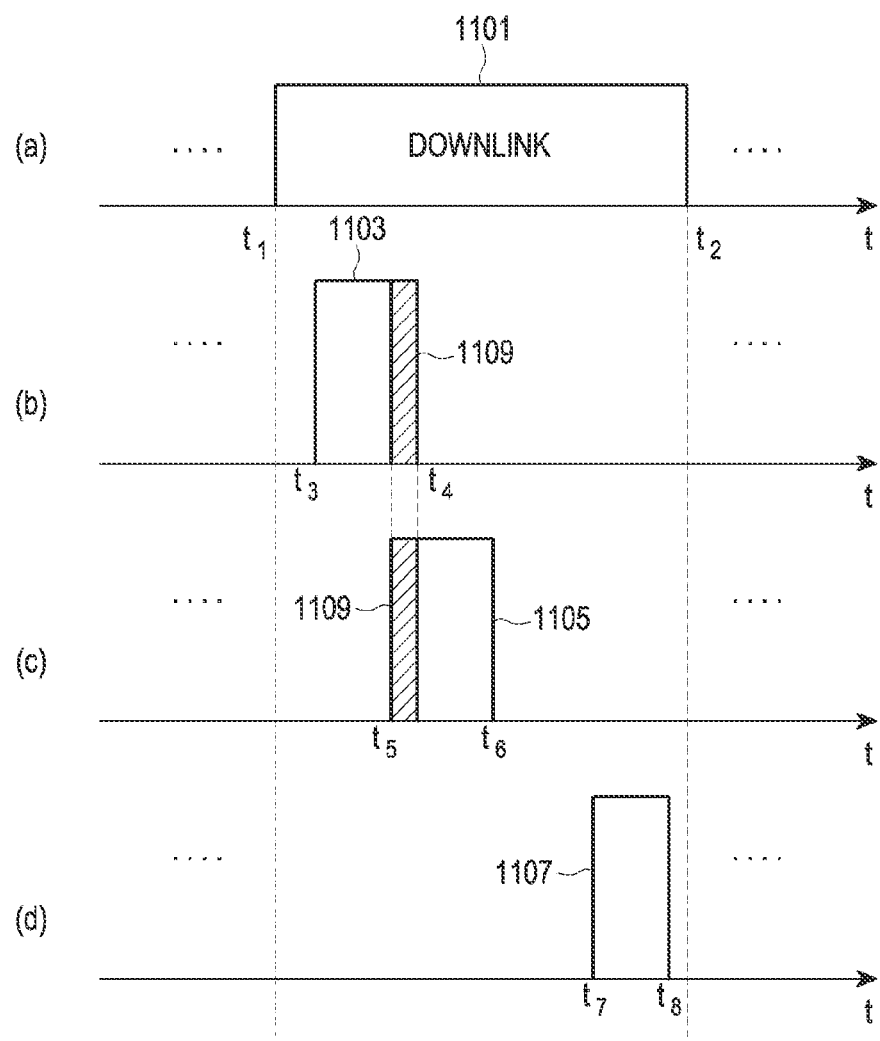
FIG. 11 illustrates a method of determining a first weight vector based on first TWT information of a plurality of devices in a second electronic device according to an embodiment.

FIG. 11 illustrates a method of determining a first weight vector based on first TWT information of a plurality of devices in a second electronic device (e.g., a second electronic device 403 in FIG. 4) according to an embodiment. For example, FIG. 11 will be described with reference to with the devices illustrated in FIG. 5A.

Referring to FIG. 11, timeline (a) shows a DL service period 1101 of the second electronic device 403. The DL service period 1101 within one period may be time from $t_1$ to $t_2$. The DL service period 1101 of the second electronic device 403 may be synchronized with a DL service period of first and second external electronic devices 501a and 501b.

Timeline (b) shows a first TWT service period 1103 of a first electronic device 401. The first TWT service period 1103 of the first electronic device 401 within one period may be time from $t_3$ to $t_4$.

Timeline (c) shows a first TWT service period 1105 of a first external electronic device 501a. The first TWT service period 1105 of the first external electronic device 501a within one period may be time from $t_5$ to $t_6$.

Timeline (d) shows a first TWT service period 1107 of a second external electronic device 501b. The first TWT service period 1107 of the second external electronic device 501b within one period may be time from $t_7$ to $t_8$.

The second electronic device 403 may identify the first TWT service period 1103 of the first electronic device 401 and the first TWT service periods 1105 and 1107 of the first and second external electronic devices 501a and 501 b. The second electronic device 403 may identify that there is time (e.g., time from $t_5$ to $t_4$) during which the first TWT service period 1103 of the first electronic device 401 at least partially overlaps with the first TWT service period 1105 of the first external electronic device 501a. The second electronic device 403 may perform a channel sounding operation for the first external electronic device 501a for which the overlap occurs. The second electronic device 403 may perform a channel sounding operation corresponding to the first TWT service period 1105 of the first external electronic device 501a. The second electronic device 403 may identify a DL channel matrix for the first electronic device 401 and a DL channel matrix for the first external electronic device 501a based on a result of the channel sounding operation, and determine a first weight vector based on the DL channel matrix for the first electronic device 401 and the DL channel matrix for the first external electronic device 501a. The second electronic device 403 may apply the determined first weight vector to a second antenna (e.g., a second antenna 411 in FIG. 4) during the first TWT service period 1103 of the first electronic device 401.

As described above, the second electronic device 403 may perform channel sounding for an external electronic device that may be affected by signal interference during the first TWT service period 1103 of the first electronic device 401, instead of performing channel sounding for all external electronic devices included in neighboring BSSs. The second electronic device 403 may perform a channel sounding operation corresponding to a first TWT service period of an external electronic device that may be affected by signal interference during the first TWT service period 1103 of the first electronic device 401, instead of performing a channel sounding operation every arbitrary time within the DL service period 1101. The second electronic device 403 may apply a first weight vector which is based on a DL channel matrix of an external electronic device which generates overlap during a first TWT service period of a client (e.g., the first electronic device 401) whose overlap occurs, instead of determining the first weight vector which is constant during the DL service period 1101.

Unlike the above, timeline (d) in FIG. 11 may be a first TWT service period 1107 of another client that establishes a communication connection with the second electronic device 403. Even in this case, the second electronic device 403 may identify an external electronic device that is affected by signal interference during a first TWT service period of each of the first electronic device 401 and the other client. For example, the second electronic device 403 may identify the first external electronic device 501a that may be affected by signal interference during the first TWT service period of the first electronic device 401 among the first electronic device 401 and the other client, and perform channel sounding for the first external electronic device 501a. The second electronic device 403 may determine a first weight vector based on a DL channel matrix for the first electronic device 401 and a DL channel matrix for the first external electronic device 501a. The second electronic device 403 may apply a first weight vector, which is determined based on the DL channel matrix of the first electronic device 401 and the DL channel matrix of the first external electronic device 501a to a period (e.g., a period from $t_3$ to $t_4$) which includes the first TWT service period 1103 of the first electronic device 401, which may generate signal interference to an external electronic device (e.g., the first external electronic device 501a), and apply a first weight vector which is determined based on the DL channel matrix of the other client to a period (e.g., a period from $t_7$ to $t_8$), which includes the first TWT service period 1107 of the other client, which does not generate signal interference to an external electronic device.

The second electronic device 403 may identify a third external electronic device having a first TWT service period that overlaps with the first TWT service period 1107 of the other client. In this case, the second electronic device 403 may apply a first weight vector that is determined based on the DL channel matrix of the first electronic device 401 and the DL channel matrix of the first external electronic device 501a to a period (e.g., a period from $t_3$ to $t_4$), which includes the first TWT service period 1103 of the first electronic device 401, and apply a first weight vector that is determined based on the DL channel matrix of the other client and the DL channel matrix of the third external electronic device (not shown) to a period (e.g., a period from $t_7$ to $t_8$), which includes the first TWT service period 1107 of the other client (not shown).

Figure 12:
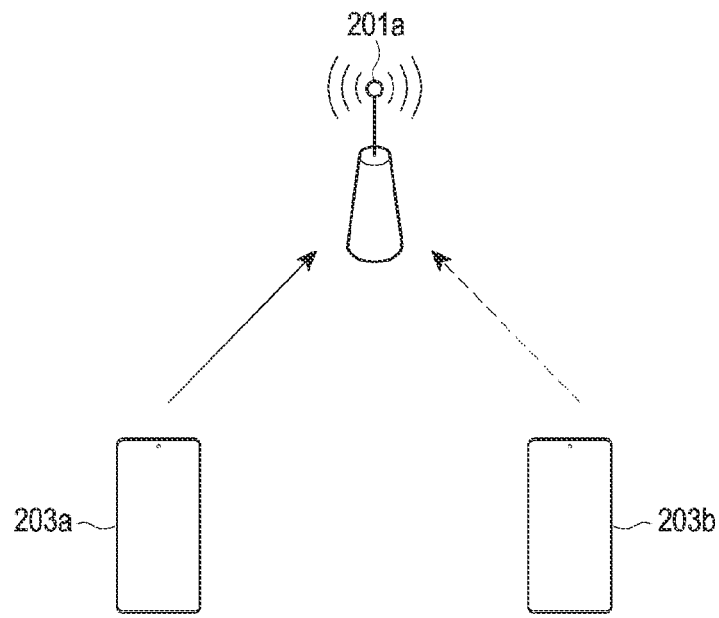
FIG. 12 illustrates a method of alleviating signal interference during an uplink service period according to an embodiment.

FIG. 12 illustrates a method of alleviating signal interference during a UL service period according to an embodiment.

Referring to FIG. 12, a first AP 201a, a first device 203a, and a second device 203b are illustrated. The first device 203a may be a client of the first AP 201a, and the first device 203a and the first AP 201a may compose a first BSS. The second device 203b may compose a second BSS with an AP (e.g., a second AP 201b in FIG. 3B) different from the first AP 201a. UL service periods and DL service periods of the first BSS and the second BSS may be synchronized, and the first AP 201a may be affected by signal interference due to a communication signal transmitted by the second device 203b included in a neighboring BSS (e.g., the second BSS) within a UL service period.

The first AP 201a, which is affected by signal interference, may identify second channel information (e.g., a UL channel matrix) for the second device 203b to alleviate signal interference from the second device 203b. For example, the first AP 201a may identify a specific field (e.g., an LTF) of a communication signal received from the second device 203b to identify the second channel information for the second device 203b.

Referring to FIG. 12, within a UL service period, a CP (e.g., the first CP 407a as illustrated in FIG. 4) of the second device 203b may be in an awake state during a second TWT service period, and be in a doze state during time which is not the second TWT service period. The second device 203b does not transmit a communication signal in the doze state, so the second device 203b may generate signal interference to the first AP 201a during the second TWT service period, but may not generate signal interference to the first AP 201a during the time (e.g., the doze state that is not the second TWT service period). As the number of antennas included in the first AP 201a may be limited, it may be difficult to determine a second weight vector based on second channel information for each of a large number of devices during an UL service period. If the first AP 201a is possible to identify a second TWT service period of the second device 203b within a UL service period and there is a possibility of being affected by signal interference by a large number of devices, the first AP 201a may identify devices that may actually generate signal interference during a second TWT service period of the second device 203b in order to determine a second weight based on second channel information for the identified devices. The first AP 201a may identify, within an UL service period, the second device 203b based on specific information (e.g., address information) within a MAC header and/or identification information (e.g., a BSS color) of a BSS included in an HE-SIG-A field of a signal received from the second device 203b. The first AP 201a may identify that the identified second device 203b is an external electronic device that generates signal interference during a second TWT service period of the first device 203a.

Figure 13:
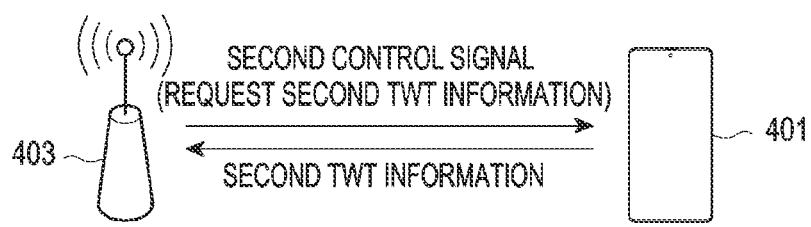
FIG. 13 illustrates a second protocol for alleviating signal interference during an uplink service period according to an embodiment.

FIG. 13 illustrates a second protocol for alleviating signal interference during a UL service period according to an embodiment.

Referring to FIG. 13, an AP that may be affected by signal interference from a device may efficiently determine a second weight vector if the AP is able to identify a second TWT service period of the device that generates signal interference.

More specifically, a second electronic device 403 (e.g., a first AP 201a in FIG. 12) may transmit a second control signal to a first electronic device 401 (e.g., a second device 203b in FIG. 12). The second control signal may be an action frame which causes the first electronic device 401 that receives the second control signal to perform a specific operation. The second control signal may cause the first electronic device 401 that receives the second control signal to transmit second TWT information of the first electronic device 401 to the second electronic device 403. The second TWT information may include information about a wake time, a period, and/or a length of a TWT service period of the first electronic device 401 within a UL service period.

If the second control signal is received from the second electronic device 403, the first electronic device 401 may transmit the second TWT information of the first electronic device 401 to the second electronic device 403. The second TWT information may be included in a specific field (e.g., a TWT information field) of an action frame and transmitted to the second electronic device 403.

Transmission of a second control signal may be performed by the first electronic device 401. The first electronic device 401 may transmit a second control signal to the second electronic device 403. The second control signal transmitted from the first electronic device 401 may be an action frame that controls (or requests) the second electronic device 403 to transmit second TWT information of another electronic device (e.g., a client of the second electronic device 403 different from the first electronic device 401) that establishes a Wi-Fi communication connection with the second electronic device 403.

Figure 14A:
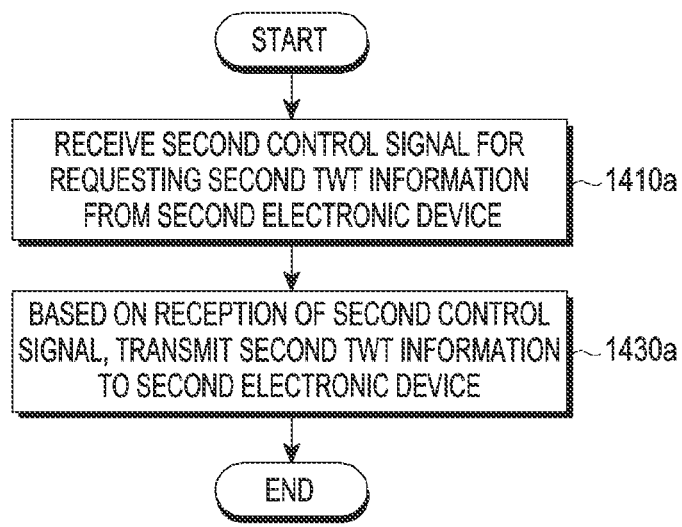
FIG. 14A is a flowchart illustrating an operation of a first electronic device based on a second protocol according to an embodiment.

FIG. 14A is a flowchart illustrating an operation of a first electronic device based on a second protocol according to an embodiment.

Referring to FIG. 14A, the first electronic device (e.g., a first electronic device 401 in FIG. 4) may generate signal interference to a second electronic device (e.g., a second electronic device 403 in FIG. 4). For example, the first electronic device may be the second device 203b illustrated in FIG. 12, and the second electronic device may be the first AP 201a illustrated in FIG. 12.

In step 1410a, the first electronic device receives a second control signal that requests second TWT information from the second electronic device.

In step 1430a, the first electronic device transmits the second TWT information to the second electronic device based on reception of the second control signal. The first electronic device may transmit the second TWT information of the first electronic device to the second electronic device that transmits the second control signal, in response to receiving the second control signal.

Figure 14B:
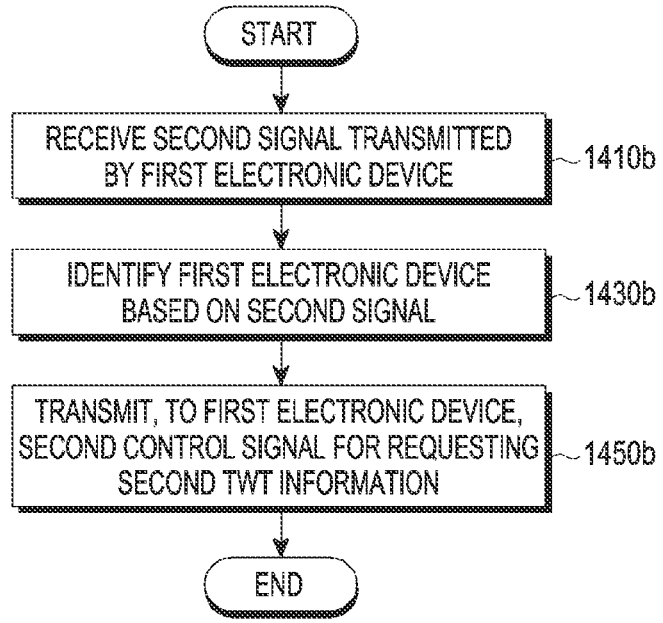
FIG. 14B is a flowchart illustrating an operation of a second electronic device based on a second protocol according to an embodiment.

FIG. 14B is a flowchart illustrating an operation of a second electronic device based on a second protocol according to an embodiment.

Referring to FIG. 14B, a first electronic device (e.g., a first electronic device 401 in FIG. 4) may generate signal interference to a second electronic device (e.g., a second electronic device 403 in FIG. 4). For example, the first electronic device may be the second device 203b illustrated in FIG. 12, and the second electronic device may be the first AP 201a illustrated in FIG. 12.

In step 1410b, the second electronic device receives a second signal transmitted by the first electronic device. The second signal may be a packet transmitted by the first electronic device.

In step 1430b, the second electronic device identifies the first electronic device based on the second signal. The second electronic device may identify specific information (e.g., address information) within a MAC header and/or identification information (e.g., a BSS color) of a BSS included in an HE-SIG-A field of the second signal in order to identify the first electronic device that transmits the second signal. The second electronic device may identify that the identified first electronic device is an external electronic device that has not established a communication connection with the second electronic device. The second electronic device may identify that the identified first electronic device generates signal interference.

In step 1450b, the second electronic device transmits a second control signal for requesting second TWT information to the first electronic device. The second electronic device may control the first electronic device to transmit the second TWT information of the first electronic device by transmitting the second control signal.

In step 1430b described above, the first electronic device that transmits the second signal may not be identified. For example, the second electronic device may not identify the first electronic device based on the specific information within the MAC header and/or the identification information of the BSS included in the HE-SIG-A field of the received second signal. If the first electronic device that transmits the second signal is not identified, the second electronic device may broadcast the second control signal in step 1450b. For example, the second electronic device may broadcast the second control signal without specifying an electronic device. The second electronic device may receive second TWT information of at least one electronic device located nearby in response to broadcasting the second control signal.

Figure 15A:
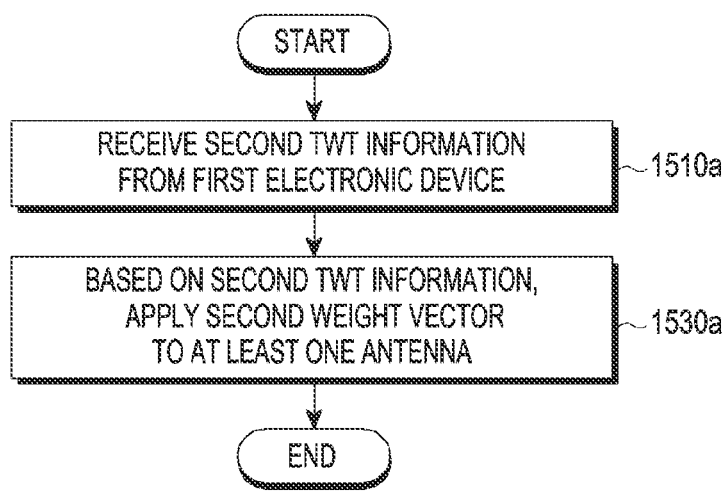
FIG. 15A is a flowchart illustrating a method for alleviating signal interference based on second TWT information in a second electronic device according to an embodiment.

FIG. 15A is a flowchart illustrating a method for alleviating signal interference based on second TWT information in a second electronic device according to an embodiment.

Referring to FIG. 15A, a first electronic device (e.g., a first electronic device 401 in FIG. 4) may generate signal interference to the second electronic device (e.g., a second electronic device 403 in FIG. 4). For example, the first electronic device may be the second device 203b illustrated in FIG. 12, and the second electronic device 403 may be the first AP 201a illustrated in FIG. 12.

The second electronic device may request second TWT information of the first electronic device from the first electronic device that may generate signal interference to the second electronic device during a UL service period.

In step 1510a, the second electronic device receives the second TWT information of the first electronic device. The second electronic device may receive the second TWT information of the first electronic device from the first electronic device in order to identify a second TWT service period of the first electronic device.

In step 1530a, the second electronic device applies a second weight vector to a plurality of antennas based on the second TWT information. The second electronic device may determine a second weight vector based on second channel information of the first electronic device, and receive a communication signal in a state in which the second weight vector is applied to at least one antenna (e.g., at least one of antennas 411-1, 411-2, . . . , and 411-n in FIG. 4), thereby alleviating signal interference from the first electronic device.

Figure 15B:
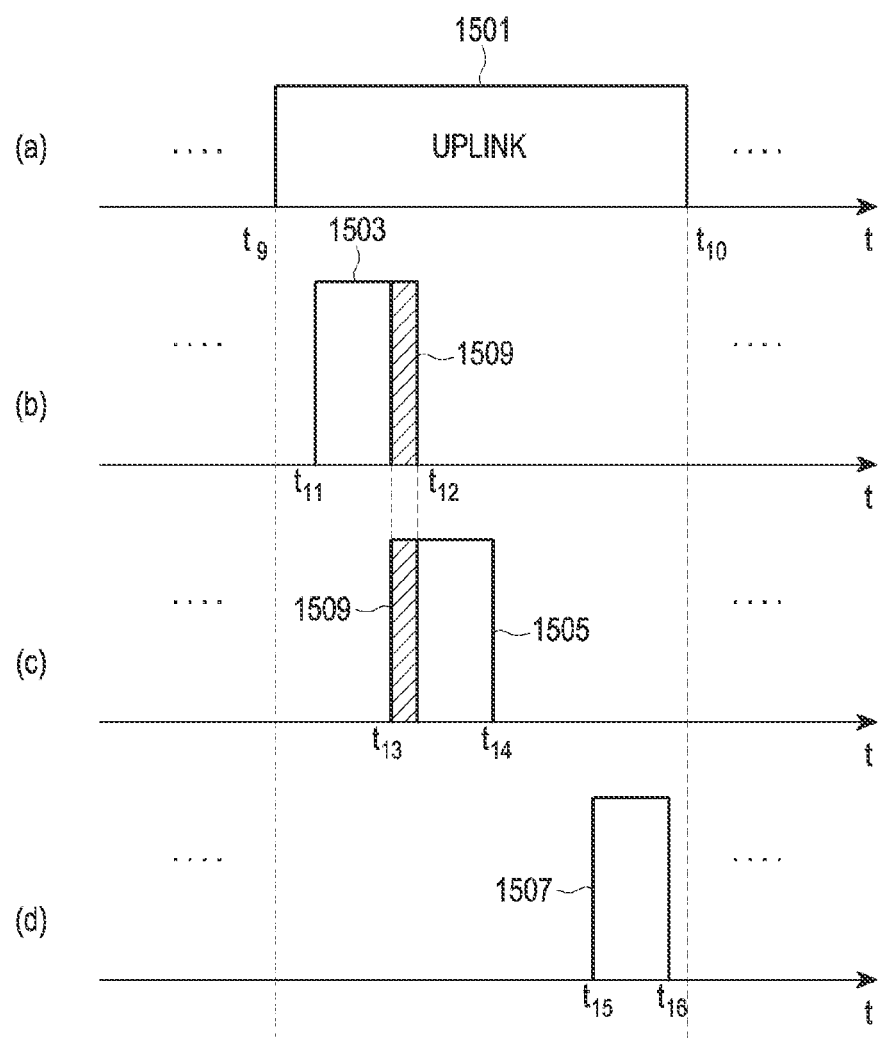
FIG. 15B illustrates a method of determining a second weight vector based on second TWT information of a plurality of devices in a second electronic device according to an embodiment.

FIG. 15B illustrates a method of determining a second weight vector based on second TWT information of a plurality of devices in a second electronic device according to an embodiment. For example, FIG. 15B will be described with reference to FIG. 5B.

Referring to FIG. 15B, timeline (a) shows a UL service period 1501 of the second electronic device 403. The UL service period 1501 within one period may be time from $t_9$ to $t_{10}$. As described in FIG. 6A, the UL service period 1501 of the second electronic device 403 may be synchronized with an UL service period of first and second external electronic devices 501a and 501b.

Timeline (b) shows a second TWT service period 1503 of a first electronic device 401 included in the same BSS as the second electronic device 403. The second TWT service period 1503 of the first electronic device 401 within one period may be time from $t_{11}$ to $t_{12}$.

Timeline (c) shows a second TWT service period 1505 of a first external electronic device 501a included in a BSS (e.g., a neighboring BSS) different from the second electronic device 403. The second TWT service period 1505 of the first external electronic device 501a within one period may be time from $t_{13}$ to $t_{14}$.

Timeline (d) shows a second TWT service period 1507 of a second external electronic device 501b included in the BSS (e.g., the neighboring BSS) different from the second electronic device 403. The second TWT service period 1507 of the second external electronic device 501b within one period may be time from $t_{15}$ to $t_{16}$.

The second electronic device 403 may identify the second TWT service period 1503 of the first electronic device 401 and the second TWT service periods 1505 and 1507 of the first and second external electronic devices 501a and 501b. The second electronic device 403 may identify that there is time (e.g., time from $t_{13}$ to $t_{12}$) during which the second TWT service period 1503 of the first electronic device 401 at least partially overlaps with the second TWT service period 1505 of the first external electronic device 501a. The second electronic device 403 may identify a UL channel matrix for the first external electronic device 501a for which the overlap occurs and a UL channel matrix for the first electronic device 401. The second electronic device 403 may determine a second weight vector based on the UL channel matrix for the first external electronic device 501a and the UL channel matrix for the first electronic device 401. The second electronic device 403 may apply the determined second weight vector to a second antenna (e.g., a second antenna 411 in FIG. 4) during the second TWT service period 15103 of the first electronic device 401.

As described above, the second electronic device 403 may determine the second weight vector based on a UL channel matrix of an external electronic device that may generate signal interference during a first TWT service period 1503 of the first electronic device 401, instead of determining the second weight vector based on UL channel matrices for all external electronic devices included in neighboring BSSs. The second electronic device 403 may apply a second weight vector that is based on a UL channel matrix of an external electronic device that generates signal interference during a second TWT service period of a client (e.g., the first electronic device 401), instead of determining the second weight vector that is constant during the UL service period 1501.

Unlike the above, timeline (d) in FIG. 15B may be a second TWT service period 1507 of another client that establishes a communication connection with the second electronic device 403. Even in this case, the second electronic device 403 may identify an external electronic device that may generate signal interference during a second TWT service period of each of the first electronic device 401 and the other client. For example, the second electronic device 403 may identify that the second external electronic device 501a may generate signal interference during the second TWT service period of the first electronic device 401 among the first electronic device 401 and the other client, and determine a second weight vector based on a UL channel matrix for the first electronic device 401 and a UL channel matrix for the first external electronic device 501*a*. The second electronic device 403 may apply a second weight vector that is determined based on the UL channel matrix of the first electronic device 401 and the UL channel matrix of the first external electronic device 501*a* to a period (e.g., a period from $t_{11}$ to $t_{12}$) that includes the second TWT service period 1503 of the first electronic device 401, which may be affected by signal interference from an external electronic device (e.g., the first external electronic device 501*a*), and apply a second weight vector that is determined based on the UL channel matrix of the other client to a period (e.g., a period from $t_{15}$ to $t_{16}$), which includes the second TWT service period 1507 of the other client, which is not affected by signal interference from an external electronic device.

The second electronic device 403 may identify a third external electronic device having a second TWT service period that overlaps with the second TWT service period 1507 of the other client. In this case, the second electronic device 403 may apply a second weight vector, which is determined based on the UL channel matrix of the first electronic device 401 and the UL channel matrix of the first external electronic device 501*a*, to a period (e.g., a period from $t_{11}$ to $t_{12}$) that includes the second TWT service period 1503 of the first electronic device 401, and apply a second weight vector, which is determined based on the UL channel matrix of the other client and the UL channel matrix of the third external electronic device, to a period (e.g., a period from $t_{15}$ to $t_{16}$) that includes the second TWT service period 1507 of the other client.

Figure 16:
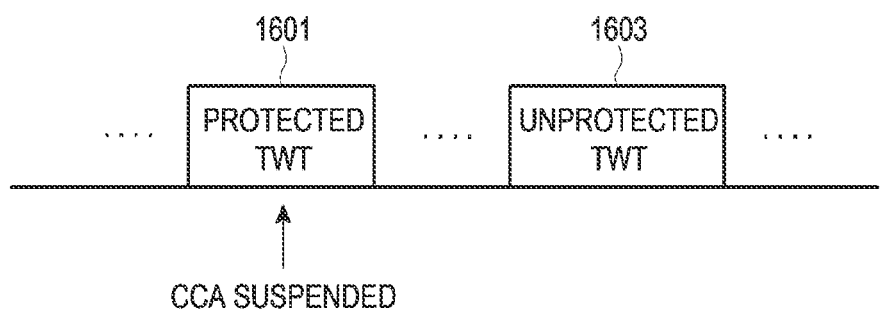
FIG. 16 illustrates an operation of controlling a CCA in a first electronic device or a second electronic device according to an embodiment.

FIG. 16 illustrates an operation of controlling a CCA in a first electronic device (e.g., a first electronic device 401 in FIG. 4) or a second electronic device (e.g., a second electronic device 403 in FIG. 4) according to an embodiment.

Referring to FIG. 16, the first electronic device may be a client of the second electronic device, and the first electronic device and the second electronic device may be included in the same BSS.

The CCA may be an operation in which the first electronic device or the second electronic device identifies whether a wireless medium via which a communication signal is to be transmitted is occupied by another electronic device before transmitting the communication signal.

During a DL service period of the first electronic device and the second electronic device, the second electronic device may perform CCA, and the first electronic device may perform an operation of controlling the CCA. As described above, a first TWT service period of the first electronic device may be protected by an AP in a neighboring BSS. For example, an AP in a neighboring BSS may determine a first weight vector based on first TWT information of the first electronic device and first channel information for the first electronic device and apply the first weight vector to antennas, so signal interference from the AP in the neighboring BSS to the first electronic device may not occur during the first TWT service period of the first electronic device. Even if the first TWT service period of the first electronic device is protected, if the second electronic device performs CCA before transmitting a communication signal, it may be determined that a wireless medium via which the communication signal is transmitted is likely to be occupied by another electronic device (e.g., the AP in the neighboring BSS), so transmission of the communication signal may be delayed. Similarly, during a UL service period of the first electronic device and the second electronic device, the first electronic device may perform CCA and the second electronic device may perform an operation of controlling the CCA. As described above, a second TWT service period of the first electronic device may be protected by a device in a neighboring BSS.

For example, the second electronic device may determine a second weight vector based on second channel information for the device in the neighboring BSS that may generate signal interference during a second TWT service period of the first electronic device, and apply the second weight vector to antennas, so signal interference from the device in the neighboring BSS to the second electronic device may not occur during the second TWT service period of the first electronic device. Even if the second TWT service period of the first electronic device is protected, if the first electronic device performs CCA before transmitting a communication signal, it may be determined that a wireless medium via which the communication signal is transmitted is occupied or is likely to be occupied by another electronic device (e.g., the device in the neighboring BSS), so transmission of the communication signal may be delayed.

The first electronic device may transmit, to the second electronic device, first protection information indicating whether a first TWT service period of the first electronic device is protected. The first TWT service period of the first electronic device being protected may mean that another electronic device (e.g., an AP in a neighboring BSS) applies a first weight vector that is determined based on first channel information for the first electronic device corresponding to the first TWT service period of the first electronic device, such that the first electronic device may receive a communication signal (e.g., a DL communication signal) from the second electronic device without being affected by interference due to a communication signal transmitted by the other electronic device (e.g., the AP in the neighboring BSS) during the first TWT service period of the first electronic device. The first protection information may include information indicating whether the first electronic device is not affected by interference from the other electronic device.

The first electronic device 401 may transmit a first control signal to the other electronic device, identify that the other electronic device performs a channel sounding operation, and apply a first weight vector that is determined based on first channel information for the first electronic device corresponding to a first TWT service period of the first electronic device. The first electronic device may transmit first protection information to the second electronic device based on identifying that the other electronic device performs the channel sounding operation, and apply the first weight vector that is determined based on the first channel information for the first electronic device corresponding to the first TWT service period of the first electronic device 401.

The second electronic device may receive first protection information. If it is identified that a first TWT service period of the first electronic device is a protected TWT service period 1601 (e.g., if it is identified that interference from another electronic device does not occur in the first electronic device during the first TWT service period of the first electronic device), the second electronic device may suspend performance of CCA. In this case, the second electronic device may transmit a communication signal to the first electronic device during the first TWT service period, regardless of whether a wireless medium is occupied by the other electronic device. If it is identified that the first TWT service period of the first electronic device is an unprotected TWT service period 1603, the second electronic device may perform CCA, perform a random delay wait in a state in which the wireless medium is not occupied by the other electronic device, and then transmit a communication signal to the first electronic device after the random delay wait.

The second electronic device may transmit, to the first electronic device, second protection information indicating whether a second TWT service period of the first electronic device is protected. The second TWT service period of the first electronic device being protected may mean that the second electronic device applies a second weight vector that is determined based on second channel information for another electronic device, corresponding to the second TWT service period of the first electronic device, such that the second electronic device may receive a communication signal (e.g., a UL communication signal) from the first electronic device without being affected by interference due to a communication signal transmitted by the other electronic device during the second TWT service period of the first electronic device. The second protection information may include information indicating whether the second electronic device is not affected by interference from the other electronic device.

The second electronic device may transmit a second control signal to the other electronic device that may generate signal interference during the second TWT service period of the first electronic device, and receive second TWT information of the other electronic device from the other electronic device in response to the second control signal. The second electronic device may determine a second weight vector corresponding to second channel information for the other electronic device based on the received second TWT information of the other electronic device, apply the second weight vector, and transmit the second protection information to the first electronic device based on application of the weight vector.

The first electronic device 401 may receive second protection information. If it is identified that a second TWT service period of the first electronic device is a protected TWT service period 1601, the first electronic device may suspend performance of CCA. In this case, the first electronic device may transmit a communication signal to the second electronic device during the second TWT service period, regardless of whether a wireless medium is occupied by the other electronic device.

If it is identified that the second TWT service period of the first electronic device is an unprotected TWT service period 1603, the second electronic device may perform CCA, perform a random delay wait in a state in which the wireless medium is not occupied by the other electronic device, and then transmit a communication signal to the first electronic device after a random delay wait.

The first protection information indicating whether the first TWT service period of the first electronic device is protected and/or the second protection information indicating whether the second TWT service period of the first electronic device is protected may be included in a TWT information field defined in an IEEE 802.11ax standard. An additional field may be defined in a TWT information element by extending the TWT information element defined in the IEEE 802.11ax standard, so the first protection information and/or the second protection may be included in the additional field.

The first electronic device may control CCA of the second electronic device by transmitting first protection information to the second electronic device. The second electronic device may control CCA of the first electronic device by transmitting second protection information to the first electronic device. The first electronic device may periodically transmit first protection information to the second electronic device, and the second electronic device may monitor whether a first TWT service period is protected. The second electronic device may periodically transmit second protection information to the first electronic device, and the first electronic device may monitor whether a second TWT service period is protected.

Figure 17:
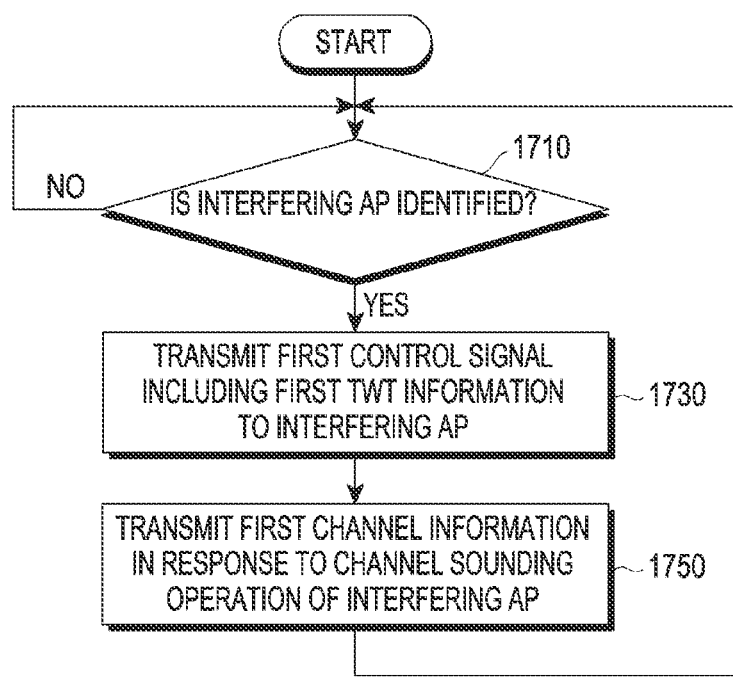
FIG. 17 is a flowchart illustrating an operation of a first electronic device according to an embodiment.

FIG. 17 is a flowchart illustrating an operation of a first electronic device (e.g., a first electronic device 401 in FIG. 4) according to an embodiment. For example, a first electronic device may be the second device 203b illustrated in FIG. 7, and an interfering AP may be the first AP 201a illustrated in FIG. 7. The first electronic device may be a client of the second AP 201b.

Referring to FIG. 17, in step 1710, the first electronic device determines whether an interfering AP is identified. The first electronic device may identify address information within a MAC header of a communication signal received from the outside to identify an external electronic device that transmits the communication signal. If the identified external electronic device is an AP different from the second AP 201b, the first electronic device may determine that the interfering AP is identified. If the interfering AP is not identified in step 1710, the first electronic device re-performs step 1710.

If the interfering AP is identified in step 1710, the first electronic device transmits a first control signal including first TWT information to the interfering AP in step 1730. The first electronic device may control the interfering AP to perform a channel sounding operation by transmitting the first control signal to the interfering AP.

In step 1750, the first electronic device transmits first channel information in response to the channel sounding operation of the interfering AP. The first electronic device may receive a reference signal for the channel sounding operation from the interfering AP, and transmit the first channel information in response to reception of the reference signal.

Figure 18A:
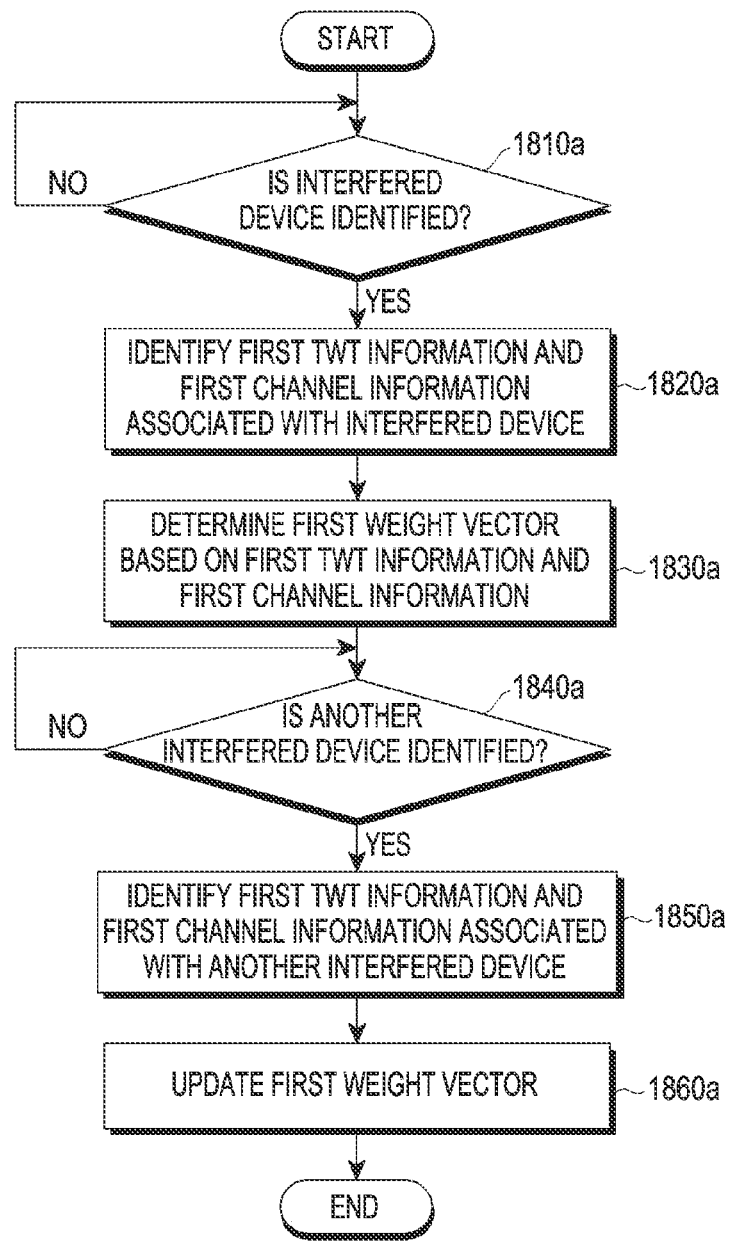
FIG. 18A is a flowchart illustrating a method of updating a first weight vector in a second electronic device according to an embodiment.

FIG. 18A is a flowchart illustrating a method of updating a first weight vector in a second electronic device (e.g., a second electronic device 403 in FIG. 4) according to an embodiment.

Referring to FIG. 18A, the second electronic device may be the first AP 201a illustrated in FIG. 7, and an interfered device may be the second device 203b illustrated in FIG. 7, which is affected by signal interference from the second electronic device. The second electronic device may be included in the same BSS as the first device 203a illustrated in FIG. 7.

In step 1810a, the second electronic device determines whether an interfered device is identified. If a first control signal is received, the second electronic device may determine that the interfered device is identified. For example, if it is identified that interference occurs due to a signal transmitted from the second electronic device, the interfered device (e.g., the second device 203b) may transmit a first control signal to the second electronic device. The second electronic device may identify the interfered device that transmits the first control signal by identifying address information within a MAC header of the first control signal.

If the interfered device is not identified in step 1810a, the first electronic device re-performs step 1810a.

If the interfered device is identified in step 1810a, the second electronic device identifies first TWT information and first channel information related to the interfered device in step 1820a. The second electronic device may identify the first TWT information of the interfered device included in the received first control signal. The second electronic device may perform a channel sounding operation for the identified interfered device in response to reception of the first control signal, and receive the first channel information of the interfered device from the interfered device in response to performance of the channel sounding operation.

In step 1830*a*, the second electronic device determines a first weight vector based on the first TWT information and the first channel information. The second electronic device may identify that a first TWT service period of the first device 203*a* and a first TWT service period of the interfered device overlap at least partially based on the first TWT information of the first device 203*a* and the first TWT information of the interfered device. The second electronic device may determine a first weight vector based on the first channel information of the first device 203*a* and the first channel information of the interfered device. The second electronic device may, during the first TWT service period of the first device 203*a*, apply the first weight vector and transmit a communication signal to the first device 203*a*. The second electronic device may, during the first TWT service period of the first device 203*a*, apply the first weight vector and transmit a signal, thereby alleviating signal interference in the interfered device (e.g., the second device 203*b*).

In step 1840*a*, the second electronic device determines whether another interfered device is identified. If a first control signal is received from an external electronic device different from the interfered device in step 1810*a*, the second electronic device may determine that the other interfered device is identified. The second electronic device may identify address information within a MAC header of the first control signal in order to identify the other interfered device that transmits the first control signal.

If the other interfered device is not identified in step 1840*a*, the first electronic device re-performs step 1840*a*.

If the other interfered device is identified in step 1840*a*, the second electronic device identifies first TWT information and first channel information related to the other interfered device in step 1850*a*. The second electronic device may identify the first TWT information of the other interfered device included in a received first control signal. The second electronic device may perform a channel sounding operation for the identified other interfered device in response to reception of the first control signal, and receive the first channel information of the other interfered device from the other interfered device in response to performance of the channel sounding operation.

In step 1860*a*, the second electronic device updates the first weight vector. The second electronic device may identify that the first TWT service period of the first device 203*a* and the first TWT service period of the other interfered device overlap at least partially based on the first TWT information of the first device 203*a* and the first TWT information of the other interfered device. The second electronic device may re-determine the first weight vector based on the first channel information of the first device 203*a*, the first channel information of the interfered device, and the first channel information of the other interfered device. The second electronic device may apply the first weight vector that is re-determined and transmit a communication signal to the first device 203*a* during the first TWT service period of the first device 203*a*.

The second electronic device may identify that first TWT service periods of a plurality of devices overlap at least partially based on first TWT information of each of the plurality of devices in a BSS to which the second electronic device belongs. For example, if the first device 203*a* and another device exist in the BSS to which the second electronic device belongs, the second electronic device may identify that the first TWT service period of the first device 203*a* or a TWT service period of the other device overlaps with the first TWT service period of the interfered device based on the first TWT information of the first device 203*a*, the first TWT information of the other device, and the first TWT information of the interfered device.

In step in operation 1840*a*, the second electronic device may receive a first control signal from the same interfered device (e.g., the second device 203*b*). For example, if an environment of a BSS to which the second electronic device and the first device 203*a* belong or an environment of a BSS to which the interfered device (e.g., the second device 203*b*) belongs changes, the second electronic device may receive the first control signal from the same interfered device. A change in an environment of a BSS may include a movement of electronic devices included in the BSS, a change in TWT information, or a change in strength of a transmission signal. If the first control signal is re-received from the same interfered device, the second electronic device may re-determine the first weight vector, and apply the re-determined first weight vector and transmit a communication signal to the first device 203*a* during the first TWT service period of the first device 203*a*.

Figure 18B:
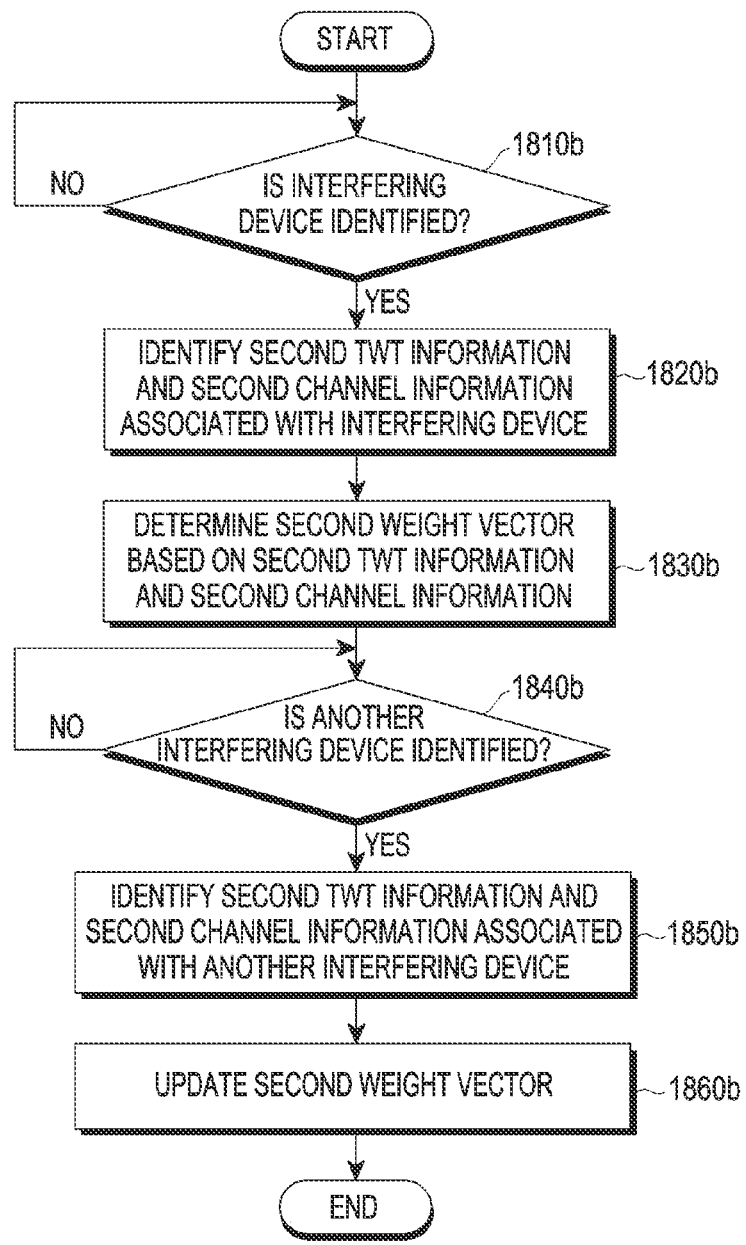
FIG. 18B is a flowchart illustrating a method of updating a second weight vector in a second electronic device according to an embodiment.

FIG. 18B is a flowchart illustrating a method of updating a second weight vector in a second electronic device (e.g., a second electronic device 403 in FIG. 4) according to an embodiment.

Referring to FIG. 18B, the second electronic device may be the first AP 201*a* illustrated in FIG. 12, and an interfering device may be the second device 203*b* illustrated in FIG. 12. The second electronic device may be included in the same BSS as the first device 203*a* illustrated in FIG. 12.

In step 1810*b*, the second electronic device determines whether an interfering device is identified. The second electronic device may identify address information within a MAC header of a communication signal received from the outside in order to identify an external electronic device that transmits the communication signal. If the identified external electronic device is different from the first device 203*a*, the second electronic device may determine that the interfering device is identified.

If the interfering device is not identified in step 1810*b*, the first electronic device re-performs step 1810*b*.

If the interfering device is identified in step 1810*b*, the second electronic device identifies second TWT information and second channel information related to the interfering device in step 1820*b*. The second electronic device may transmit, to the identified interfering device, a second control signal for requesting second TWT information of the interfering device, and receive the second TWT information of the interfering device from interfering device in response to transmission of the second control signal. The second electronic device may identify a specific field (e.g., an LTF) of the communication signal received in step 1810*b* in order to identify second channel information of the interfering device.

In step 1830*b*, the second electronic device determines a second weight vector based on the second TWT information and the second channel information. The second electronic device may identify that a second TWT service period of the first device 203*a* and a second TWT service period of the interfering device overlap at least partially based on the second TWT information of the first device 203*a* and the second TWT information of the interfering device. The second electronic device may determine a second weight vector based on the second channel information of the first device 203a and the second channel information of the interfering device. The second electronic device may apply the second weight vector and receive a communication signal from the first device 203a during the second TWT service period of the first device 203a.

In step 1840b, the second electronic device determines whether another interfering device is identified. The second electronic device may identify address information within a MAC header of a communication signal received from the outside in order to identify an external electronic device that transmits the communication signal. If the identified external electronic device is different from the first device 203a and the identified interfering device, the second electronic device may determine that the other interfering device is identified.

If the other interfering device is not identified in step 1840b, the first electronic device re-performs step 1840b.

If the other interfering device is identified in step 1840b, the second electronic device identifies second TWT information and second channel information related to the other interfering device in step 1850b. The second electronic device may transmit, to the identified other interfering device, a second control signal for requesting second TWT information of the other interfering device, and receive the second TWT information of the other interfering device from the other interfering device in response to transmission of the second control signal. The second electronic device may identify a specific field (e.g., an LTF) of the communication signal received in step 1840b in order to identify second channel information of the other interfering device.

In step 1860b, the second electronic device updates the second weight vector. The second electronic device may identify that the second TWT service period of the first device 203a and a second TWT service period of the other interfering device overlap at least partially based on the second TWT information of the first device 203a and the second TWT information of the other interfering device. The second electronic device may re-determine the second weight vector based on the second channel information of the first device 203a, the second channel information of the interfering device, and the second channel information of the other interfering device. The second electronic device may apply the re-determined second weight vector and receive a communication signal from the first device 203a during the second TWT service period of the first device 203a.

Figure 19:
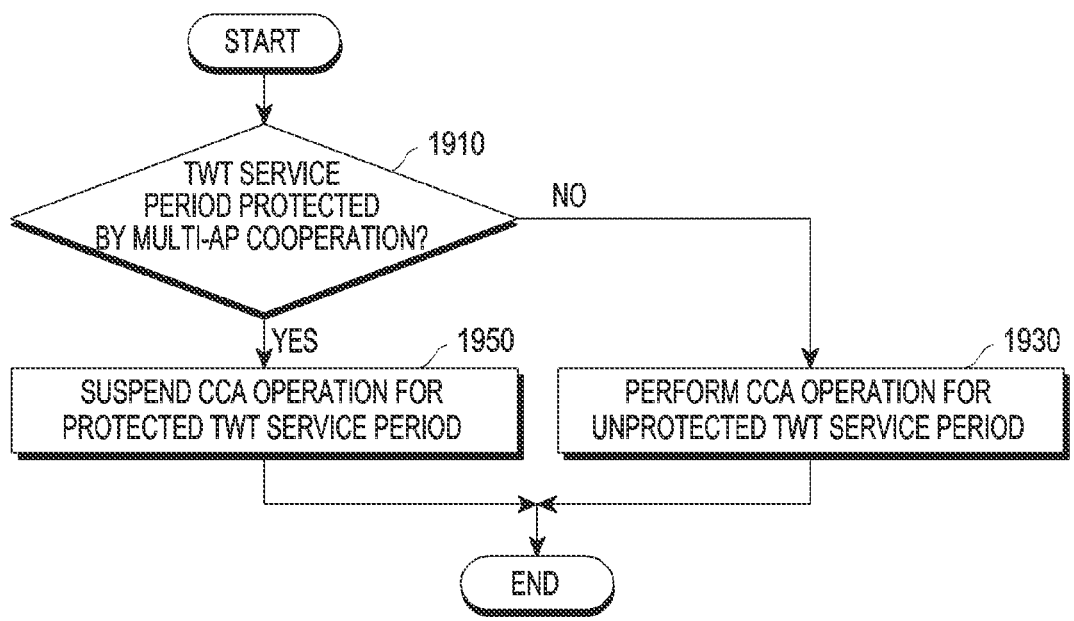
FIG. 19 is a flowchart illustrating a method of controlling a CCA in a first electronic device or a second electronic device according to an embodiment.

FIG. 19 is a flowchart illustrating a method of controlling a CCA in a first electronic device (e.g., a first electronic device 401 in FIG. 4) or a second electronic device (e.g., a second electronic device 403 in FIG. 4) according to an embodiment.

Referring to FIG. 19, the first electronic device may be a client of the second electronic device, and the first electronic device and the second electronic device may be included in the same BSS.

In step 1910, the first electronic device or the second electronic device identify whether it is a TWT service period that is protected by multi-AP cooperation. The first electronic device may receive second protection information from the second electronic device, and identify whether a second TWT service period of the first electronic device is a protected TWT service period. The second electronic device may receive first protection information from the first electronic device, and identify whether a first TWT service period of the first electronic device is the protected TWT service period.

If it is identified that the first TWT service period or the second TWT service period is a TWT service period that is not protected by the multi-AP cooperation in step 1910, the first electronic device or the second electronic device perform a CCA operation on the unprotected TWT service period in step 1930. The first electronic device or the second electronic device may transmit a communication signal after performing the CCA operation. The first electronic device or the second electronic device may monitor whether the first TWT service period or the second TWT service period is protected by the multi-AP cooperation.

If it is identified that the first TWT service period or the second TWT service period is a TWT service period that is protected by the multi-AP cooperation, the first electronic device or the second electronic device may suspend the CCA operation for the protected TWT service period in step 1950. The first electronic device or the second electronic device may monitor whether the first TWT service period or the second TWT service period is protected by the multi-AP cooperation.

According to an embodiment, an electronic device may comprise at least one communication circuit, and at least one processor, and the at least one processor may be configured to: receive a synchronization signal from a first external electronic device by using the at least one communication circuit, and based on the received synchronization signal, determine an operation mode of the electronic device as one of a DL operation mode or an UL operation mode, and the synchronization signal may be a signal for setting the operation mode of the electronic device to be identical to an operation mode of a second external electronic device included in a neighboring BSS with respect to the electronic device.

The at least one processor may be configured to: based on the received synchronization signal, identify a first period for operating in the DL operation mode and a second period for operating in the UL operation mode, and based on the identified first period and the identified second period, operate in the DL operation mode or the UL operation mode.

A ratio of the first period to the second period may be determined based on traffic information of a BSS in which the electronic device is included and a plurality of neighboring BSSs.

The at least one processor may be further configured to, during the first period, receive a first control signal from the second external electronic device by using the at least one communication circuit, and based on receiving the first control signal, perform a channel sounding operation with respect to the second external electronic device by using the at least one communication circuit.

The first control signal may include first TWT information of the second external electronic, and the at least one processor may be further configured to: based on the first TWT information, perform the channel sounding operation with reference to the second external electronic device by using the at least one communication circuit.

The electronic device may further comprise a plurality of antennas, and the at least one processor may be further configured to: based on the performed channel sounding operation, identify first channel information of the second external electronic device, and based on the identified first channel information of the second external electronic device, determine a first weight vector with respect to the plurality of antennas.

The at least one processor may be further configured to, based on the first TWT information, apply the first weight vector to the plurality of antennas.

The at least one processor may be further configured to, during the second period, receive a first signal transmitted by the second external electronic device by using the at least one communication circuit, based on the received first signal, identify the second external electronic device, and transmit a second control signal for requesting second TWT information of the second external electronic device to the identified second external electronic device by using the at least one communication circuit.

The electronic device may further comprise a plurality of antennas, and the at least one processor is further configured to: based on transmitting the second control signal, receive the second TWT information of the second external electronic device, and based on the received second TWT information, apply a second weight vector to the plurality of antennas.

The at least one processor may be further configured to: based on the received first signal, identify second channel information of the second external electronic device, and based on the identified second channel information, determine the second weight vector.

The at least one processor may be further configured to receive, by using the at least one communication circuit, from a third external electronic device which is connected to the electronic device, information indicating whether a TWT service period of the third external electronic device is protected from the neighboring BSS.

The at least one processor may be further configured to suspend a CCA operation if it is identified that the TWT service period of the third external electronic device is protected, and perform the CCA operation if it is identified that the TWT service period of the third external electronic device is not protected.

According to an embodiment, a method for controlling an electronic device may comprise receiving a synchronization signal from a first external electronic device by using at least one communication circuit of the electronic device, and based on the received synchronization signal, determining an operation mode of the electronic device as one of a DL operation mode or an UL operation mode, and the synchronization signal may be a signal for setting the operation mode of the electronic device to be identical to an operation mode of a second external electronic device included in a neighboring BSS with respect to the electronic device.

The method may further comprise, based on the received synchronization signal, identifying a first period for operating in the DL operation mode and a second period for operating in the UL operation mode, and based on the identified first period and the identified second period, operating in the DL operation mode or the UL operation mode.

A ratio of the first period to the second period may be determined based on traffic information of a BSS in which the electronic device is included and a plurality of neighboring BSSs.

The method may further comprise, during the first period, receiving a first control signal from the second external electronic device by using the at least one communication circuit, and based on receiving the first control signal, performing a channel sounding operation with respect to the second external electronic device by using the at least one communication circuit.

The first control signal may include first TWT information of the second external electronic device, and the performing the channel sounding operation with respect to the second external electronic device may comprise, based on the first TWT information, performing the channel sounding operation with reference to the second external electronic device by using the at least one communication circuit.

According to an embodiment, an electronic device may comprise at least one communication circuit; and at least one processor, and the at least one processor may be configured to: receive a second signal transmitted by a fourth external electronic device included in a neighboring BSS with respect to the electronic device by using the at least one communication circuit, based on the received second signal, identify the fourth external electronic device, and based on identifying the fourth external electronic device, transmit a first control signal to the fourth external electronic device by using the at least one communication circuit, and the first control signal may include information for causing the fourth external electronic device to perform a channel sounding operation.

The first control signal may include first TWT information of the electronic device, and the channel sounding operation may be performed based on the first TWT information.

The at least one processor may be further configured to receive, by using the at least one communication circuit, from the fourth external electronic device, a second control signal for requesting second TWT information of the electronic device, and based on receiving the second control signal, transmit the second TWT information to the fourth external electronic device by using the at least one communication circuit.

As described above, an electronic device according to an embodiment may selectively obtain channel environment information for an external electronic device that is affected by signal interference, thereby reducing a cost that occurs when obtaining the channel environment information.

An electronic device according to an embodiment may obtain channel environment information time which corresponds to a TWT service period of an external electronic device that generates signal interference, thereby reducing a cost that occurs when obtaining the channel environment information in real time.

An electronic device according to an embodiment may provide TWT information to an external electronic device that is affected by signal interference, thereby causing the external electronic device that is affected by the signal interference to receive a communication signal in a state in which the signal interference is alleviated.

An electronic device according to an embodiment may cause an external electronic device that generates signal interference to perform a channel sounding operation, thereby causing the external electronic device that generates the signal interference to alleviate the signal interface and transmit a communication signal.

Various effects exerted by the present disclosure are not limited by the above-described effects.

An electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration.

According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been particularly shown and described with reference to certain embodiments thereof, it will be understood by those of ordinary skill in the art that various changes in form and details may be made therein without departing from the spirit and scope of the disclosure as defined by the following claims and their equivalents.

What is claimed is:

1. An electronic device, comprising:
a communication circuit; and
a processor configured to:
receive, using the communication circuit, from a first external electronic device a synchronization signal related to an uplink (UL) period to be synchronized and a downlink (DL) period to be synchronized, wherein the synchronization signal comprises information indicating the UL period and the DL period of a second external electronic device, and information to set an operation mode of the electronic device to be identical to an operation mode of the second external electronic device included in a neighboring basic service set (BSS),
based on the received synchronization signal, determine the operation mode of the electronic device between a DL operation mode and an UL operation mode,
receive, from a first client device included in the neighboring BSS, a control signal comprising first target wake time (TWT) information of the first client device, and
perform a channel sounding operation with respect to the first client device based on the first TWT information within the UL period and the DL period,
wherein the electronic device comprises a first access point (AP) included in a first BSS, and the second external electronic device comprises a second AP included in a second BSS neighboring to the first BSS, and
wherein a first UL period of the first AP is synchronized with a second UL period of the second AP in the UL period, and a first DL period of the first AP is synchronized with a second DL period of the second AP in the DL period.

2. The electronic device of claim 1, wherein the processor is further configured to:
based on the received synchronization signal, identify a first period for operating in the DL operation mode and a second period for operating in the UL operation mode, and based on the identified first period and the identified second period, operate in the DL operation mode or the UL operation mode.

3. The electronic device of claim 1, wherein the processor is further configured to:
based on the performed channel sounding operation, obtain weight vector information with respect to the first client device.

4. The electronic device of claim 3, wherein the processor is further configured to, based on the first TWT information, apply the weight vector information to a plurality of antennas.

5. The electronic device of claim 2, wherein the processor is further configured to:
during the second period, receive, using the communication circuit, a first signal transmitted by a second client device included in the neighboring BSS,
based on the received first signal, identify the second client device, and
transmit, using the communication circuit, to the second client device, a second control signal for requesting second TWT information of the second client device.

6. The electronic device of claim 5, wherein the processor is further configured to:
based on transmitting the second control signal, receive a third control signal comprising the second TWT information from the second client device, and
based on the received second TWT information, apply a weight vector with respect to the second client device to a plurality of antennas.

7. The electronic device of claim 6, wherein the processor is further configured to:
based on the received first signal, identify channel information of the second client device, and
based on the identified channel information, determine the weight vector.

8. The electronic device of claim 2, wherein the processor is further configured to receive, using the communication circuit, from a third external electronic device connected to the electronic device, information indicating whether a target wake time (TWT) service period of the third external electronic device is protected from the neighboring BSS.

9. The electronic device of claim 8, wherein the processor is further configured to:
suspend a clear channel assessment (CCA) operation if it is identified that the TWT service period of the third external electronic device is protected, and
perform the CCA operation if it is identified that the TWT service period of the third external electronic device is not protected.

10. A method for controlling an electronic device, the method comprising:
receiving, using a communication circuit of the electronic device, from a first external electronic device a synchronization signal comprising an uplink (UL) period to be synchronized and a downlink (DL) period to be synchronized, wherein the synchronization signal comprises information indicating the UL period and the DL period of a second external electronic device and information to set an operation mode of the electronic device to be identical to an operation mode of the second external electronic device included in a neighboring basic service set (BSS);
based on the received synchronization signal, determining the operation mode of the electronic device between a DL operation mode and an UL operation mode;
receiving, from a first client device included in the neighboring BSS, a control signal comprising first target wake time (TWT) information of the first client device; and
performing a channel sounding operation with respect to the first client device based on the first TWT information within the UL period and the DL period,
wherein the electronic device comprises a first access point (AP) included in a first BSS, and the second external electronic device comprises a second AP included in a second BSS neighboring to the first BSS, and
wherein a first UL period of the first AP is synchronized with a second UL period of the second AP in the UL period, and a first DL period of the first AP is synchronized with a second DL period of the second AP in the DL period.

11. The method of claim 10, further comprising:
based on the received synchronization signal, identifying a first period for operating in the DL operation mode and a second period for operating in the UL operation mode; and
based on the identified first period and the identified second period, operating in the DL operation mode or the UL operation mode.

12. An electronic device, comprising:
a communication circuit; and
a processor configured to:
receive, using the communication circuit, a signal transmitted by an external electronic device included in a neighboring basic service set (BSS),
based on the received signal, identify the external electronic device that generates signal interference, and
based on identifying the interfering external electronic device, transmit, using the communication circuit, a first control signal comprising first target wake time (TWT) information of the electronic device, to the external electronic device, controlling the external electronic device to perform a channel sounding operation based on the first TWT information with respect to the electronic device.

13. The electronic device of claim 12, wherein the processor is further configured to:
receive, using the communication circuit, from the external electronic device, a second control signal for requesting second TWT information of the electronic device, and
based on receiving the second control signal, transmit, using the communication circuit, the second TWT information to the external electronic device.

\* \* \* \* \*